(12) United States Patent
Baker et al.

(10) Patent No.: US 9,403,072 B2
(45) Date of Patent: Aug. 2, 2016

(54) ELECTRONIC GOLF ASSISTANT UTILIZING ONE OR MORE LAY UP POSITIONS

(76) Inventors: Josh Baker, Scottsdale, AZ (US); Frank Craig Prichard, Scottsdale, AZ (US)

( * ) Notice: Subject to any disclaimer, the term of this patent is extended or adjusted under 35 U.S.C. 154(b) by 1079 days.

(21) Appl. No.: 12/695,365

(22) Filed: Jan. 28, 2010

(65) Prior Publication Data

US 2011/0183779 A1 Jul. 28, 2011

(51) Int. Cl.
*A63B 57/00* (2015.01)
*A63B 71/06* (2006.01)

(52) U.S. Cl.
CPC ......... *A63B 57/0081* (2013.01); *A63B 71/0622* (2013.01); *A63B 71/0669* (2013.01); *A63B 2071/0691* (2013.01); *A63B 2220/14* (2013.01); *A63B 2220/20* (2013.01)

(58) Field of Classification Search
USPC ......... 434/247, 252, 307 R; 700/92; 473/407; 342/357.25; 701/439, 526
See application file for complete search history.

(56) References Cited

U.S. PATENT DOCUMENTS

| 6,517,353 | B1 * | 2/2003 | Jones ........................... 434/252 |
| 8,070,628 | B2 * | 12/2011 | Denton et al. ................ 473/407 |
| 2002/0011949 | A1 * | 1/2002 | Rudow et al. ............ 342/357.06 |
| 2009/0201263 | A1 * | 8/2009 | Hofmann ..................... 345/173 |
| 2009/0305819 | A1 * | 12/2009 | Denton et al. ................ 473/407 |
| 2011/0184538 | A1 * | 7/2011 | Baker et al. .................... 700/92 |

\* cited by examiner

*Primary Examiner* — Masud Ahmed
(74) *Attorney, Agent, or Firm* — Brownstein Hyatt Farber Schreck, LLP

(57) ABSTRACT

Included are systems and methods for providing data. At least one embodiment of a method includes constructing, by a computing device, a segment line on a computer display of an image of a golf course, the segment line being constructed from a tee box on a golf hole to a green on the golf hole, the segment line bisecting a fairway of the hole; determining at least one lay up position on the segment line, the at least one lay up position indicating a predetermined distance from the green; and providing the at least one lay up position to a user device, the user device configured to determine a distance between the user device and the lay up position.

16 Claims, 24 Drawing Sheets

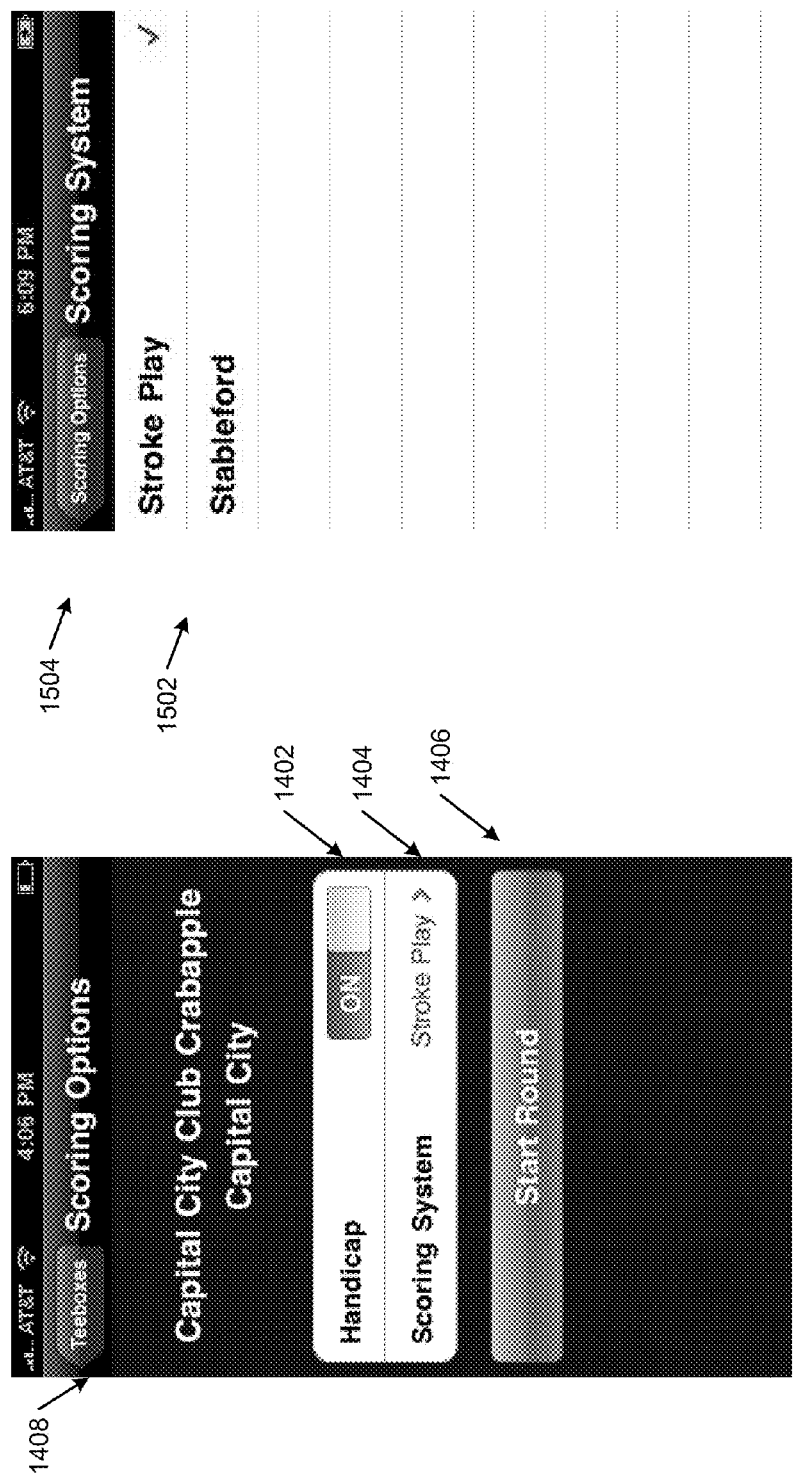

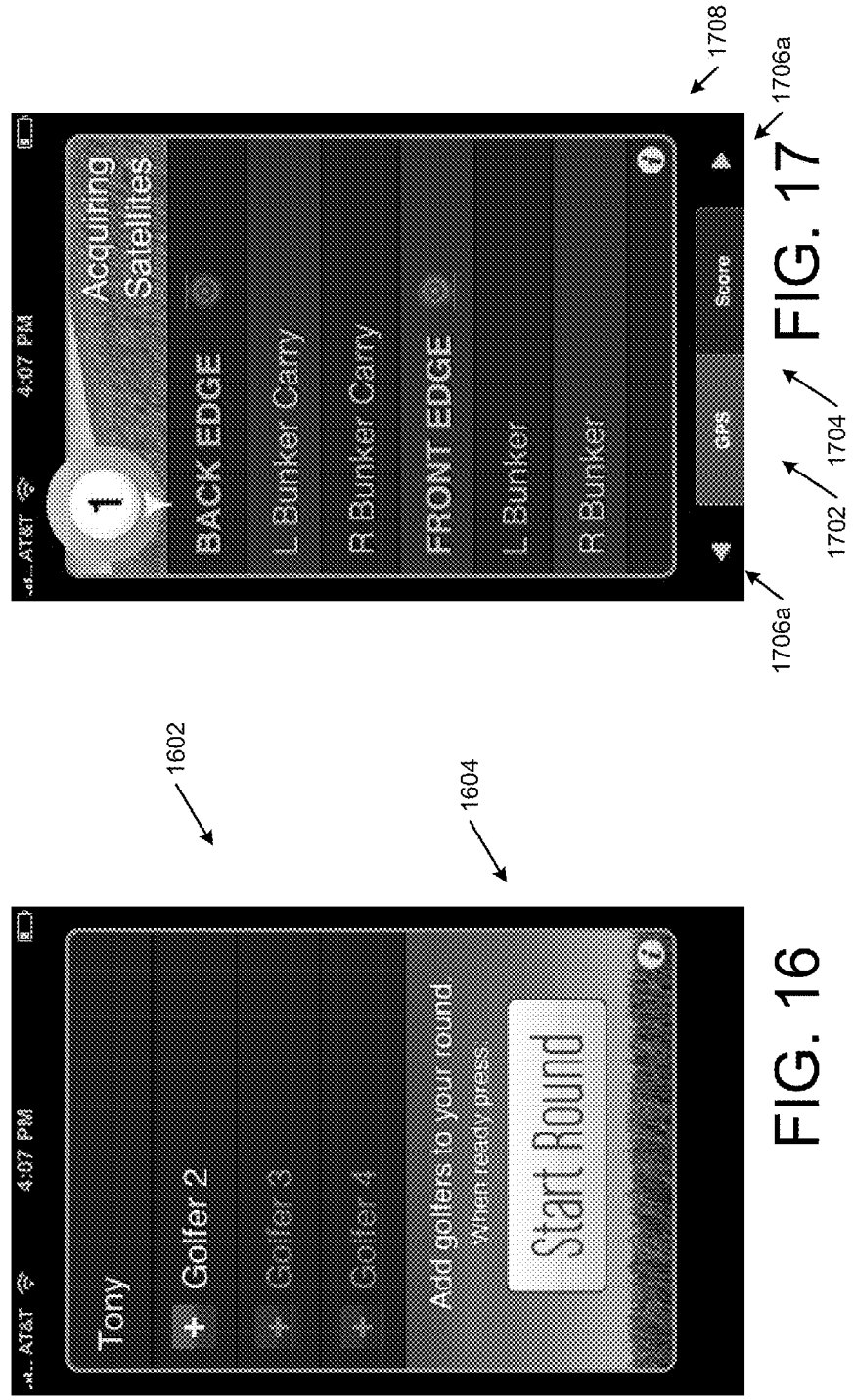

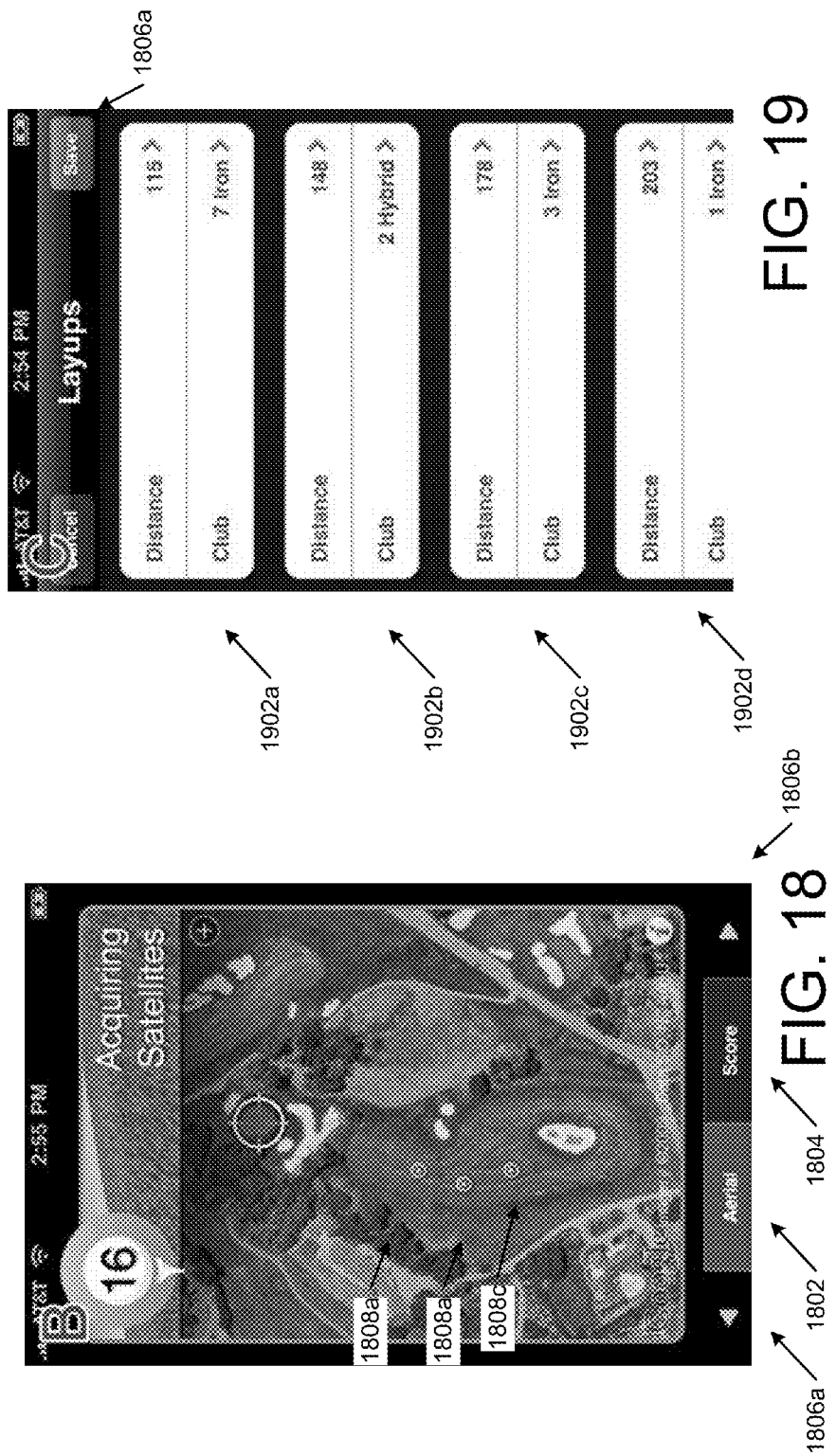

| Golfshot | Capital City Club Brookhaven |  |  |  |  |  |  |  | Atlanta, Georgia |
|---|---|---|---|---|---|---|---|---|---|
|  | 1 | 2 | 3 | 4 | 5 | 6 | 7 | 8 | 9 | OUT |
| Tony | 4 | 4 | 4 | 6 | 4 | 3 | 3 | 3 | 5 | 36 |
|  | E | E | E | +1 | +1 | +1 | +1 | E | +1 | +1 |
| PAR | 4 | 4 | 4 | 5 | 4 | 3 | 3 | 4 | 4 | 35 |
| PUTTS | 1 | 2 | 2 | 2 | 1 | 2 | 2 | 1 | 2 | 15 |
| FAIRWAYS | ● | ✦ | ✎ | ✎ | ✦ |  |  | ● | ✎ | 28% |
| GIR |  | ● | ● | ● | ● | ● | ● | ● |  | 55% |
| SAND SHOTS |  | 1 |  |  |  |  |  |  |  | 1 |
| PENALTY STROKES |  |  |  |  |  |  |  |  |  |  |

FIG. 24A

| Golfshot | Capital City Club Brookhaven |  |  |  |  |  |  |  | Atlanta, Georgia |
|---|---|---|---|---|---|---|---|---|---|
|  | 10 | 11 | 12 | 13 | 14 | 15 | 16 | 17 | 18 | IN |
| Tony | 4 | 3 | 4 | 4 | 4 | 4 | 5 | 4 | 4 | 36 |
|  | +1 | +1 | E | +1 | +1 | +1 | +1 | +2 | +2 | +1 |
| PAR | 4 | 3 | 5 | 3 | 4 | 4 | 5 | 3 | 4 | 35 |
| PUTTS | 2 | 1 | 1 | 1 | 1 | 2 | 2 | 3 | 2 | 15 |
| FAIRWAYS | ✦ |  | ✎ |  | ✎ | ● | ✎ |  | ✦ | 18% |
| GIR | ● | ● | ● | ● | ● | ● | ● | ● | ● | 66% |
| SAND SHOTS |  |  |  |  |  |  |  |  |  |  |
| PENALTY STROKES |  |  |  |  |  |  |  |  |  |  |

FIG. 24B

ELECTRONIC GOLF ASSISTANT UTILIZING ONE OR MORE LAY UP POSITIONS

CROSS REFERENCE

This application is related to U.S. application Ser. No. 12/695,350, entitled Electronic Golf Assistant Utilizing a Plurality of Images, and U.S. application Ser. No. 12/695,445, entitled Electronic Golf Assistant Utilizing Electronic Scoring, both of which are filed on the same day as this application and are hereby incorporated by reference in their entireties.

BACKGROUND

In the game of golf, a player often utilizes various pieces of information to improve his/her score. As a nonlimiting example, during a round, a player may utilize yardages to a green, to a hazard, and/or to a lay up position. Similarly, a player may also utilize statistical data from a round to determine strengths and weaknesses in his/her game. As this data may be difficult to accurately determine and present to a user, oftentimes a user is left at a disadvantage.

SUMMARY

Included are systems and methods for providing data. At least one embodiment of a method includes constructing, by a computing device, a segment line on a computer display of an image of a golf course (such as a satellite image, aerial image, etc.), the segment line being constructed from a tee box on a golf hole to a green on the golf hole, the segment line bisecting a fairway of the golf hole; determining at least one lay up position on the segment line, the at least one lay up position indicating a predetermined distance from the green; and providing the at least one lay up position to a user device, the user device configured to determine a distance between the user device and the lay up position.

Also included are embodiments of a system. At least one embodiment of the system includes a memory component that stores at least the following: a constructing component configured to construct a segment line on a computer display of an image of a golf course, the segment line being constructed from a tee box on a golf hole to a green on the hole, the segment line bisecting a fairway of the golf hole; a determining component configured to determine at least one lay up position on the segment line, the at least one lay up position indicating a predetermined distance from the green; and a providing component configured to provide the at least one lay up position to a user device, the user device configured to determine a distance between the user device and the lay up position.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 14 illustrates a nonlimiting example of a user interface that may be provided in response to selection of a tee box from the tee box list, from FIG. 12.

FIG. 15 illustrates a nonlimiting example of a user interface that may be provided in response to selection of the scoring system option, from FIG. 14.

FIG. 16 illustrates a nonlimiting example of a user interface that may be provided in response to selection of the start round option, from FIG. 14.

FIG. 17 illustrates a nonlimiting example of a user interface that may be provided in response to selection of the start round option from FIG. 16.

FIG. 18 is a nonlimiting example of a user interface for providing an image of a golf hole, similar to the diagram from FIG. 17.

FIG. 19 illustrates a nonlimiting example of a user interface for providing lay up points, such as illustrated in FIG. 18.

FIGS. 24A and 24B illustrate scorecard data, as may be compiled from user input in the interfaces from FIGS. 20-23.

DETAILED DESCRIPTION

Embodiments disclosed herein include a system and/or method that utilizes global positioning and/or other positioning systems for use by a golfer on a golf course. More specifically, by utilizing determined global position, embodiments disclosed herein may be configured to provide segment lines for lay up shots; provide dynamic lay up positions; provide touch point positions; and/or provide statistical information in a user interface.

More specifically, at least one nonlimiting example may include a user device, such as a cellular telephone, personal digital assistant, iphone™, itouch™, ipod™, Blackberry™, or other device. The user device may be configured with global positioning hardware, as well as software for determining a user's global position with reference to a golf course. Embodiments may also be configured to access satellite and/or other images (or video) associated with the determined global position.

With this information, some embodiments can determine a segment line on a satellite (or other) image of a golf hole, from the tee box to the green, through the center of the fairway. The segment line may be configured to map one or more position points (such as the lay up positions), and/or provide flyover images/videos of the hole. When one (or more) of the predetermined distances is close to or in a hazard (such as a bunker or water hazard) or other undesirable location, that lay up distance may be disabled.

Similarly, some embodiments may be configured to receive and/or utilize dynamic lay up distances. The dynamic lay up distances may be user configurable for a particular hole, golfer, and/or golf course. Additionally, another nonlimiting example may be configured to utilize a plurality of different images (and/or video) of a particular golf hole (or portion of a golf hole) to provide a clear representation of the golf hole. More specifically, in such embodiments a first image may be an accurate representation of the global position of the golf hole, however the image may be visually unclear. Similarly, second image may be a clear image of the golf hole, but the positioning data associated with the second image may be inaccurate. Such embodiments may be configured to reconcile the accurate data from the first image with the clarity of the second image.

Figure 1:
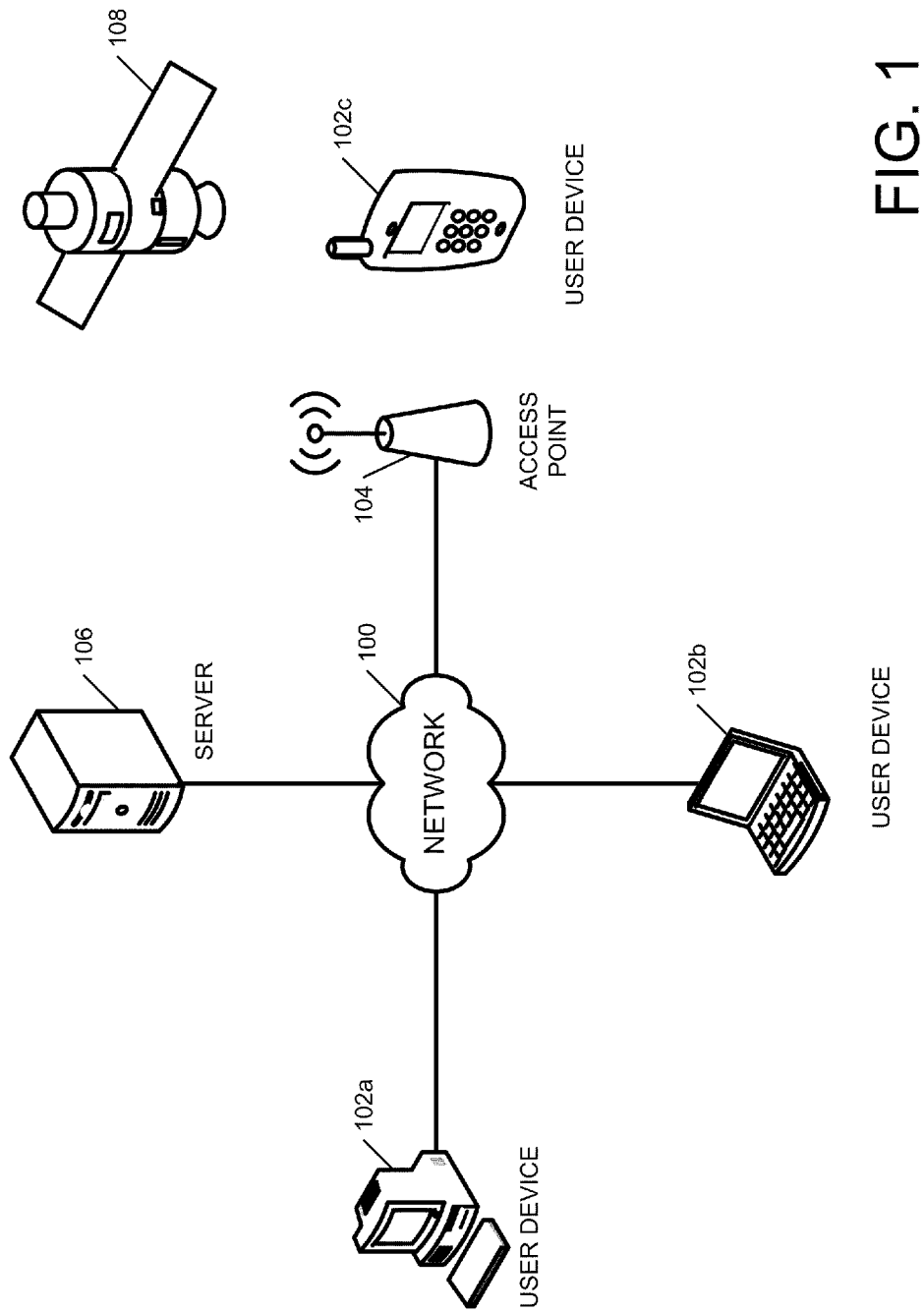
FIG. 1 illustrates an exemplary embodiment of a communications network, which may be configured to facilitate communication of data.

Referring now to the drawings, FIG. 1 illustrates an exemplary embodiment of a communications network, which may be configured to facilitate communication of data. More specifically, as illustrated in the nonlimiting example of FIG. 1, a network 100 may be utilized and include a Wide Area Network (WAN), such as the Internet, a public switched telephone network (PSTN), mobile communications network (MCN) and/or other network. Similarly, the network 100 may include a wireline and/or a wireless local area network (LAN). Regardless of the communications medium and protocol, the network 100 may be coupled to one or more user devices 102a, 102b, 102c. The user devices 102a, 102b, 102c (collectively referred to as user device 102) may include a personal computer, laptop, special purpose location device, and/or other device that is configured for communicating with the network 100. While the user devices 102a, 102b may be wireline devices, the user device 102c may be configured for wireless communications and be configured to communicate with the network 100 via an access point 104 or other wireless communications device.

Additionally included in the nonlimiting example of FIG. 1, is the access point 104. The access point 104 may be configured as a wireless cellular tower, a wireless fidelity (Wi-Fi) hotspot, a worldwide interoperability for microwave access (WIMAX) tower, a cellular tower, and/or other wireless node.

Also included in the nonlimiting example of FIG. 1 is a server 106. The server 106 may be configured to facilitate the communication of data, such as Internet data, email, instant messages, short message service (SMS) messages audio messages, video messages, and/or other electronic data.

Further included in the nonlimiting example of FIG. 1, is a satellite network 108. More specifically, the satellite network 108 may include a global positioning system (GPS) satellite network or other satellite network that communicates data with the user devices 102 for facilitating a determination of position of those user devices. While the satellite network 108 is depicted in FIG. 1 as a single satellite, this is a nonlimiting example, as the satellite network may include other satellites, computing devices, servers, networks, etc., depending on the particular configuration.

Figure 2:
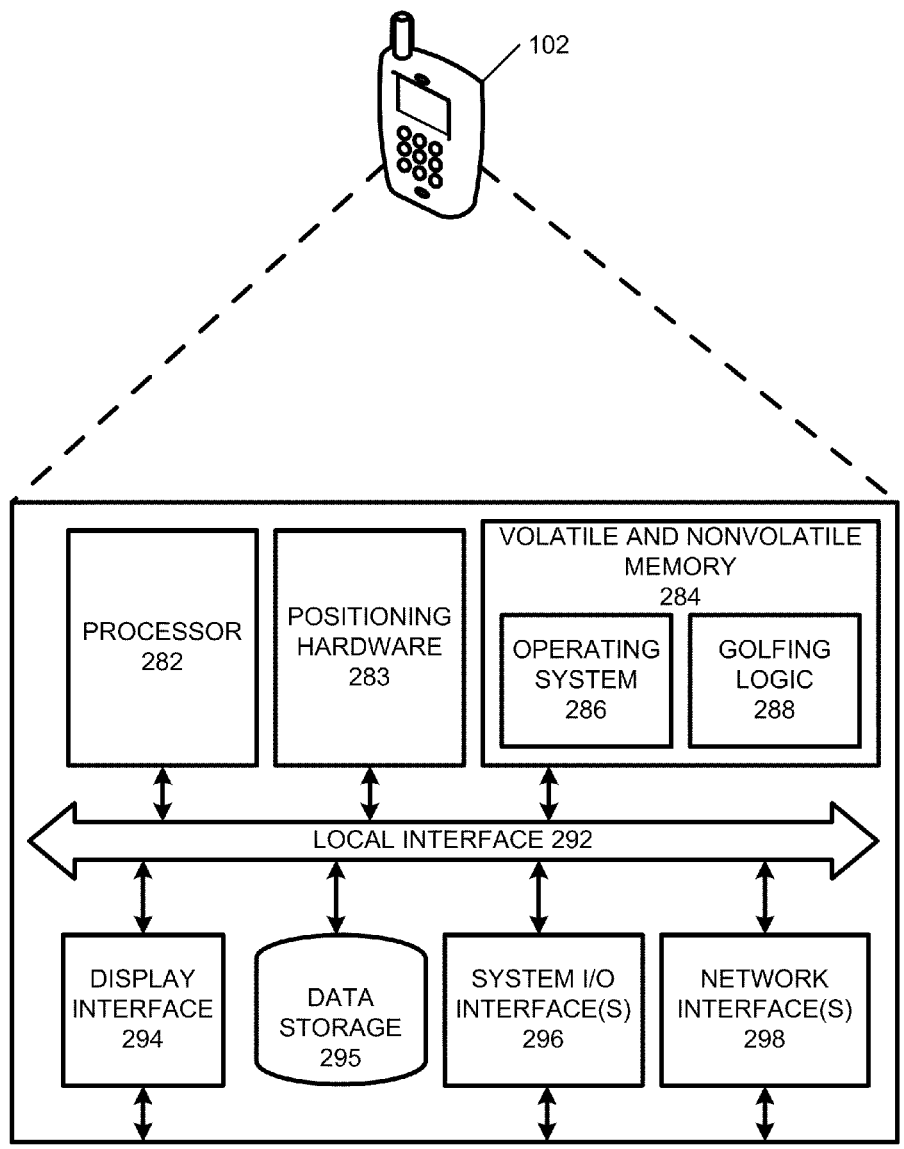
FIG. 2 illustrates an exemplary embodiment of a user device, which may be configured to provide options for uploading and/or downloading content, such as in the network from FIG. 1.

FIG. 2 illustrates an exemplary embodiment of a user device 102, which may be configured to provide options for uploading and/or downloading content, such as in the network from FIG. 1. Although a wireless device (e.g., the user device 102c) is illustrated, this discussion can be applied to wired devices, as well. According to exemplary embodiments, in terms of hardware architecture, the user device 102 includes a processor 282, positioning hardware 283, a memory component 284, a display interface 294, data storage 295, one or more input and/or output (I/O) device interface(s) 296, and/or one or more network interfaces 298 that are communicatively coupled via a local interface 292. The local interface 292 can include, for example but not limited to, one or more buses and/or other wired or wireless connections. The local interface 292 may have additional elements, which are omitted for simplicity, such as controllers, buffers (caches), drivers, repeaters, and receivers to enable communications. Further, the local interface 292 may include address, control, and/or data connections to enable appropriate communications among the aforementioned components. The processor 282 may be a device for executing software, particularly software stored in the memory component 284. The processor 282 can include any custom made or commercially available processor, a central processing unit (CPU), an auxiliary processor among several processors associated with the user device 102, a semiconductor based microprocessor (in the form of a microchip or chip set), a macroprocessor, and/or generally any device for executing software instructions.

The memory component 284 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 284 may incorporate electronic, magnetic, optical, and/or other types of storage media. One should note that the memory 284 can have a distributed architecture (where various components are situated remote from one another), but can be accessed by the processor 282.

The software in the memory 284 may include one or more separate programs, which may include an ordered listing of executable instructions for implementing logical functions. In the example of FIG. 2, the software in the memory component 284 may include the golfing logic 288, as well as an operating system 286. The operating system 286 may be configured to control the execution of other computer programs and provides scheduling, input-output control, file and data management, memory management, and communication control and related services. The golfing logic 288 may be configured to facilitate processing of location data, as determined by the positioning hardware and combine this with golf course data, user data, and/or other data. Additionally, the golfing logic 288 may be configured to provide a user interface, which conveys at least a portion of this data.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the memory component 284, so as to operate properly in connection with the operating system 286.

The input/output devices that may be coupled to the system I/O Interface(s) 296 may include input devices, for example but not limited to, a keyboard, mouse, scanner, touch screen, microphone, etc. Further, the input/output devices may also include output devices, for example but not limited to, a printer, display, speaker, etc. Further, the input/output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Additionally included are one or more of the network interfaces 298 for facilitating communication with one or more other devices. More specifically, network interface 298 may include any component configured to facilitate a connection with another device. While in some embodiments, among others, the user device 102 can include the network interface 298 that includes a personal computer memory card international association (PCMCIA) card (also abbreviated as "PC card") for receiving a wireless network card, this is a nonlimiting example. Other configurations can include the communications hardware within the user device 102, such that a wireless network card is unnecessary for communicating wirelessly. Similarly, other embodiments include the network interfaces 298 for communicating via a wired connection. Such interfaces may be configured with universal serial bus (USB) interfaces, serial ports, and/or other interfaces.

If the user device 102 includes a personal computer, workstation, or the like, the software in the memory 284 may further include a basic input output system (BIOS) (omitted for simplicity). The BIOS is a set of software routines that initialize and test hardware at startup, start the operating system 286, and support the transfer of data among the hardware devices. The BIOS is stored in ROM so that the BIOS can be executed when the user device 102 is activated.

When the user device 102 is in operation, the processor 282 may be configured to execute software stored within the memory component 284, to communicate data to and from the memory component 284, and to generally control operations of the user device 102 pursuant to the software. Software in the memory component 284, in whole or in part, may be read by the processor 282, perhaps buffered within the processor 282, and then executed.

One should note that while the description with respect to FIG. 2 includes the user device 102 as a single component, this is a nonlimiting example. More specifically, in at least one embodiment, the user device 102 can include a plurality of servers, personal computers, telephones, and/or other devices. Similarly, while the description of FIG. 2 describes the user device 102 as a mobile device, this is also a nonlimiting example. More specifically, depending on the particular exemplary embodiment, other components, such as the server 106 and/or the access point 104 may include similar elements and/or logic. Similarly, while the golfing logic may be configured in FIG. 2 with the mobile device, the golfing logic 288 may take one or more different forms, depending on the particular configuration. More specifically, as referred to herein, the golfing logic 288 may include a user implemented piece(s) of logic for receiving geographic data for a golf course. However, some embodiments refer to the golfing logic 288 as a technician implemented piece(s) of logic for mapping and/or otherwise configuring data for the user application.

Additionally, while the golfing logic 288 is illustrated in FIG. 2 as including a single software component, this is also a nonlimiting example. In at least one embodiment, the golfing logic 288 may include one or more components, embodied in software, hardware, and/or firmware. Additionally, while the golfing logic 288 is depicted as residing on a single device, such as user device 102, the golfing logic 288 may include one or more components residing on one or more different devices.

One should also note that while the nonlimiting example of FIG. 2 illustrates a user device 102, similar hardware and/or software may be associated with the server 106. More specifically, the server 106 may include one or more processor, memory component, etc., as well as logic for processing and/or providing data to the user device 102.

Figure 3:
FIG. 3 illustrates a nonlimiting example of an image of a portion of a golf course.

FIG. 3 illustrates a nonlimiting example of an image of a portion of a golf course. In operation, a technician may access the image (in addition to other images) to "map" a golf course.

More specifically, the technician (via one or more of the user devices 102 and/or server 106) can determine the location of a tee boxes, greens, hazards, fairway perimeters, and/or other features of the golf course on each hole. These locations can be determined by longitude and latitude coordinates and/or via other positioning measurements.

One should note that, in addition to the image of the golf course, the nonlimiting example of FIG. 3, includes an overlay of a street "Second Ave SE" (represented in yellow). As discussed in more detail below, in some embodiments this road data may be utilized for determining geographic accuracy of the image.

Figure 4:
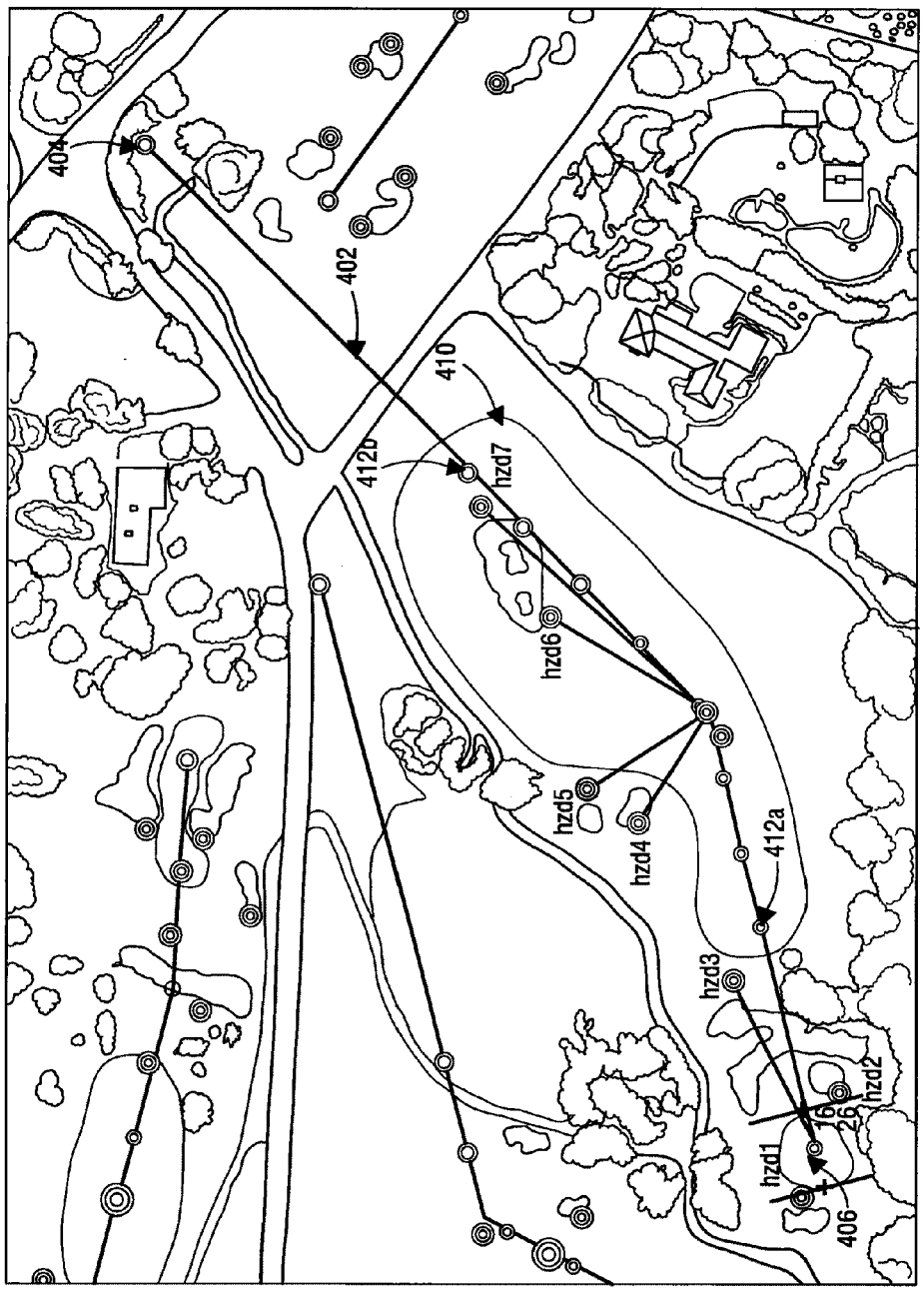
FIG. 4 illustrates a nonlimiting example of an image, illustrating utilization of a segment line on a golf course mapping, similar to the diagram from FIG. 3.

FIG. 4 illustrates a nonlimiting example of an image, illustrating utilization of a segment line on a golf course mapping, similar to the diagram from FIG. 3. More specifically, as illustrated in FIG. 4, the segment line 402 may be constructed from a tee box location 404 to a green location 406 for each hole. Additionally, if the hole includes a "dogleg," a dogleg point may be included in a fairway portion 410 of the hole at the point where the fairway bends.

Also included in the nonlimiting example of FIG. 4, are one or more lay up positions 412a, 412b (referred to collectively as lay up positions 412) on the segment line. The lay up positions 412 may be automatically set at predetermined distances from the green location 406 (e.g., 100 yards, 120 yards, 100 meters, etc.) and/or at predetermined distances from a hazard; manually set by a user; and/or determined from past user play. Additionally, if the segment line traverses a hazard, such as a water hazard, an out of bounds marker, a bunker, and/or other undesirable location, the lay up positions 412 at those points may be disabled to prevent an end user from relying on a lay up positions 412 that could result in penalty shots or other undesirable results. Further, while some hazards may reside directly on the segment line 402, some hazards may be present on the hole, but not directly in a hazard. Accordingly, in those situations, a lay up position may still be determined.

Figure 5A:
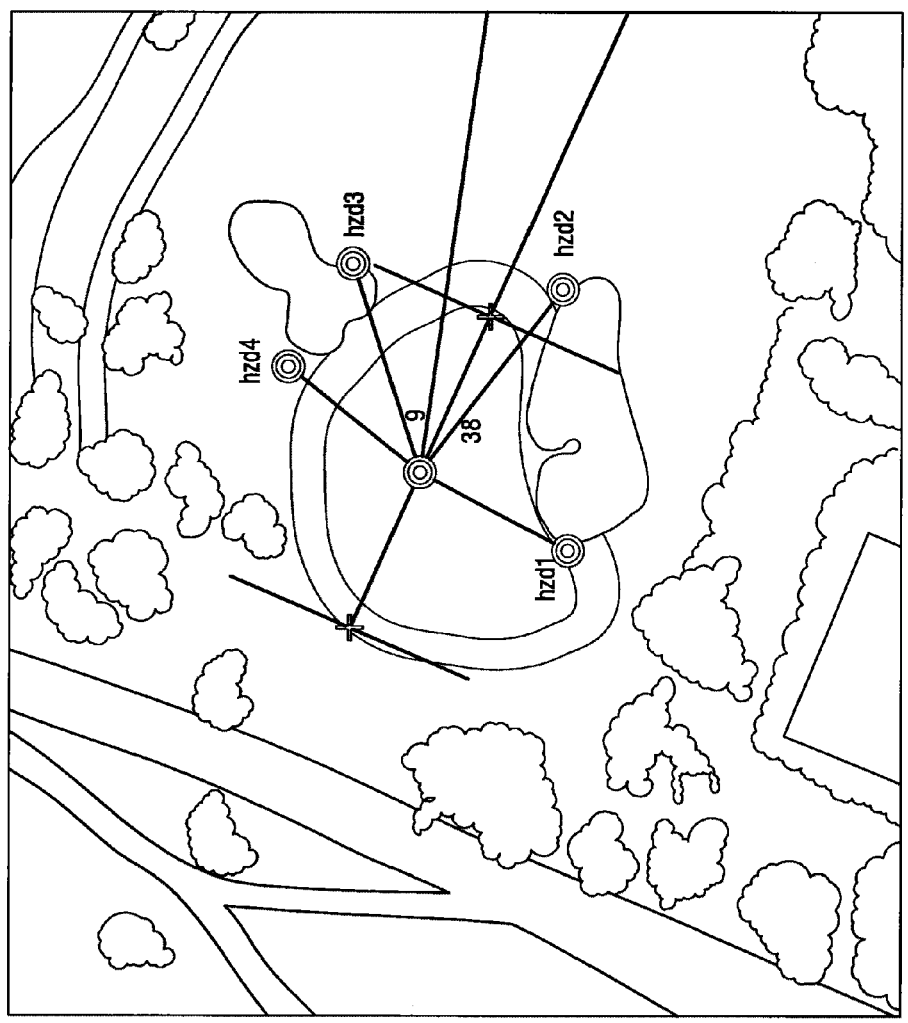
FIGS. 5A and 5B illustrate another nonlimiting example of an image of a portion of a golf course, similar to the image from FIG. 4.
Figure 5B:
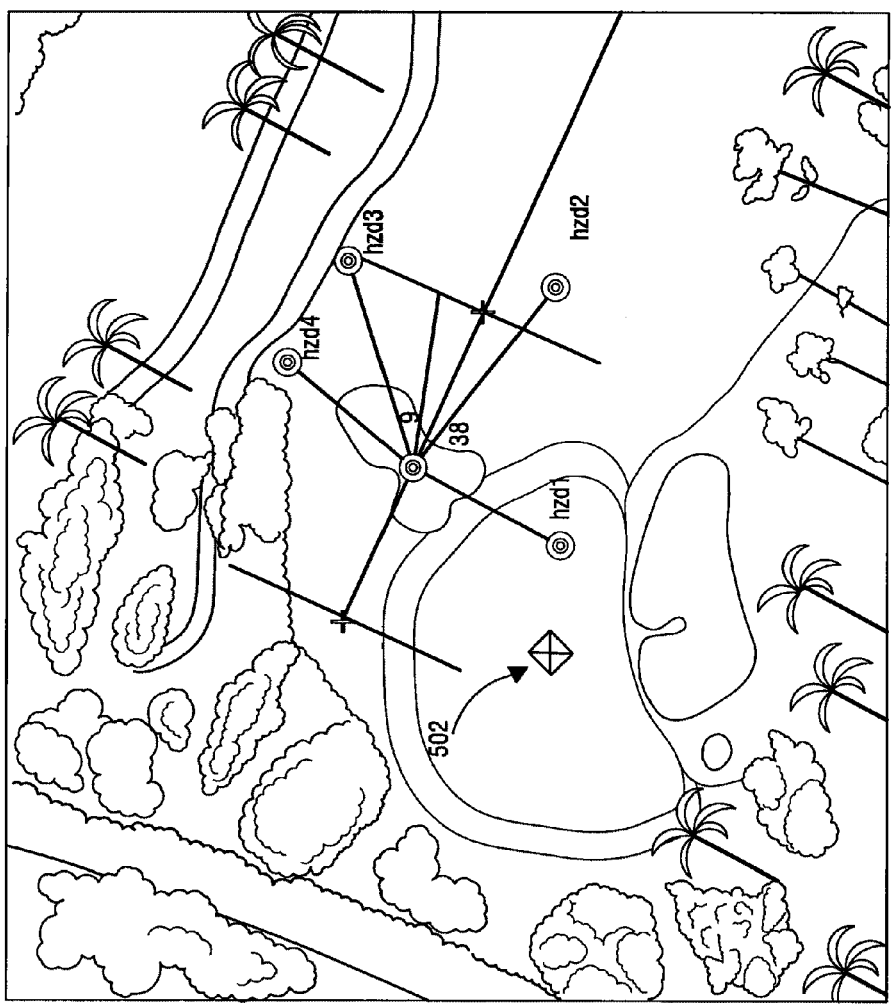

FIGS. 5A and 5B illustrate another nonlimiting example of an image of a portion of a golf course, similar to the image from FIG. 4. As illustrated above, when a golf course is mapped for global positions, a technician may access a plurality of different images. The technician may then determine which image is most accurate (FIG. 5A). This accuracy determination can be performed by comparing an alignment of road mapping with the image. More specifically, as illustrated in FIG. 3, when an online (or other) map is provided, the map often includes road mapping that overlays the image. As such, a determination can be made whether the road mapping and the image are accurately aligned with regard to the location of the golf course. As the road mapping is almost always accurate in terms of global position, the image of the golf course that is most aligned with the road mapping can be determined as the most accurate image.

While accuracy of the image is important, oftentimes the most accurate image is not the clearest image. Accordingly, an alignment between the clearest image (FIG. 5B) and the most accurate image (FIG. 5A) may be utilized using one or more common point positions 502. More specifically, mapping data of a golf course (as described in more detail above) can be performed on the most accurate image. The most accurate image can then be overlaid by the clearest image at a common point position 502. The common point position 502 may be a position (e.g., the position of the first hole) that is indicated on the clearest image. When the clearest image overlays the accurate image, the two images are aligned at the common point position 502, such that the clearest image can utilize the mapping/positioning data from the accurate image.

Additionally, while a single common point position 502 may be utilized, some embodiments may be configured to utilize a plurality of common point positions 502 to reduce inaccuracies due to a rotation of the clear image from the accurate image.

Figures 6, 7:
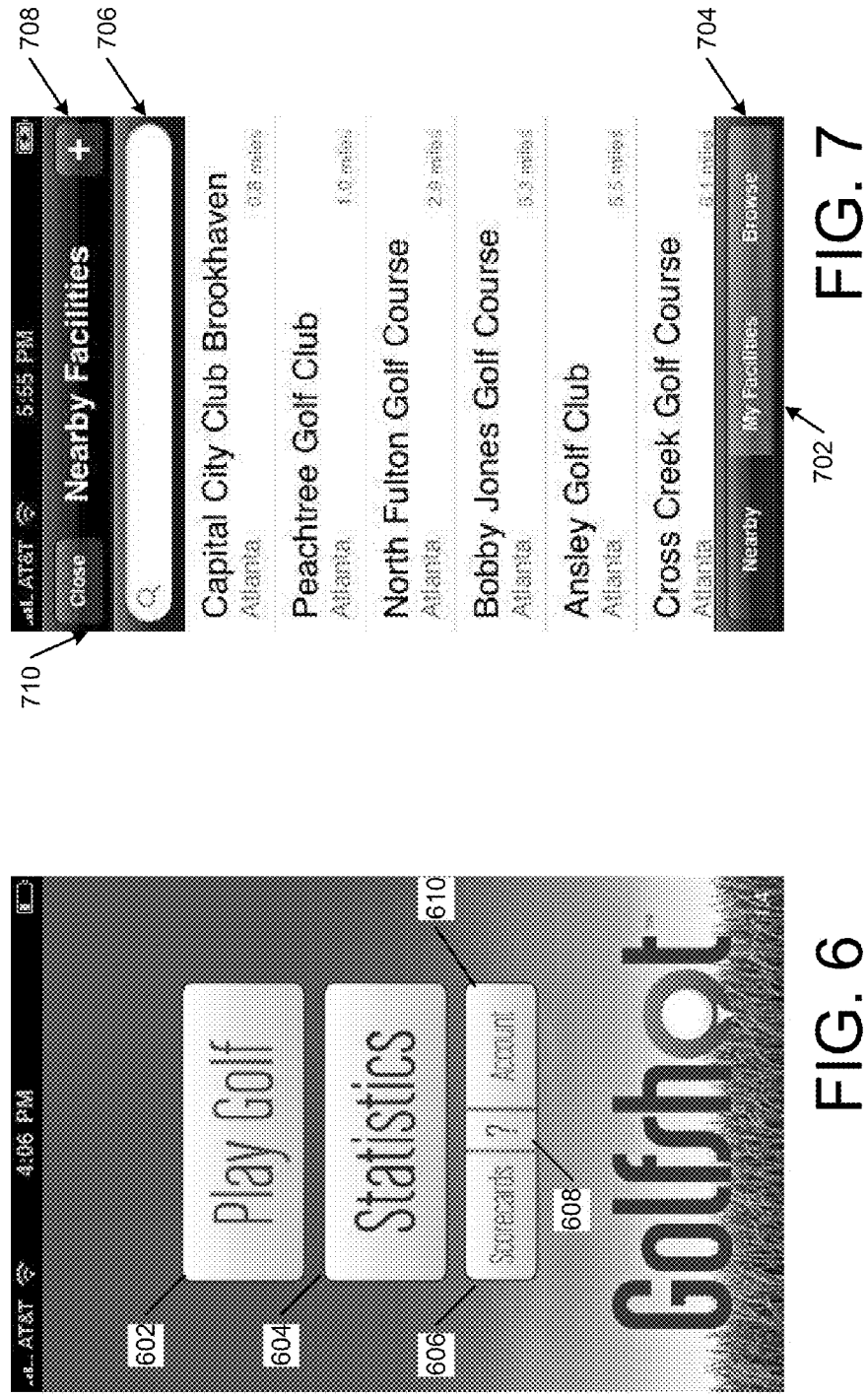
FIG. 6 illustrates a nonlimiting example of a user interface that may be provided to a user, such as on the user device 102 from FIG. 1.
FIG. 7 illustrates a nonlimiting example of a user interface that may be provided in response to selection of the play golf option 602 from FIG. 6.

FIG. 6 illustrates a nonlimiting example of a user interface that may be provided to a user, such as on the user device 102 from FIG. 1. As illustrated in FIG. 6, the user interface includes a play golf option 602, a statistics option 604, a scorecards option 606, a help option 608, and an account option 610. More or fewer options may be provided, depending on the particular configuration.

FIG. 7 illustrates a nonlimiting example of a user interface that may be provided in response to selection of the play golf option 602 from FIG. 6. As illustrated in the nonlimiting example of FIG. 7, in response to selection of the play golf option 602, from FIG. 6, a list of nearby golf courses may be provided. The nearby courses may be determined by a location previously selected by the user and/or via location (such as GPS) capabilities of the user device. Additionally included in FIG. 7 is a my facilities option 702, a browse option 704, a search option 706, an add option 708, and a close option 710 for returning to the interface from FIG. 6.

Figure 8:
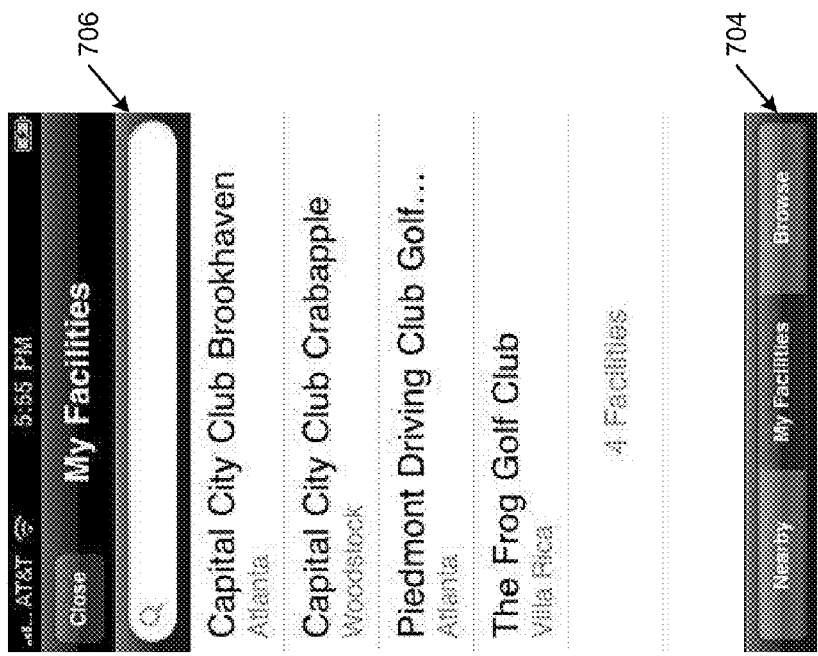
FIG. 8 illustrates a user interface that may be provided in response to selection of the my facilities option 702, from FIG. 7.

FIG. 8 illustrates a user interface that may be provided in response to selection of the my facilities option 702, from FIG. 7. More specifically, in at least one nonlimiting example, a user can indicate one or more golf courses that the user often plays for quicker access to the information for those courses. The addition and/or editing of courses in the my facilities interface of FIG. 8, may be provided by the add option 708, from FIG. 7, and/or at other places. Also included in the interface of FIG. 8 is a nearby option 802 for returning back to the interface from FIG. 7.

Figure 9:
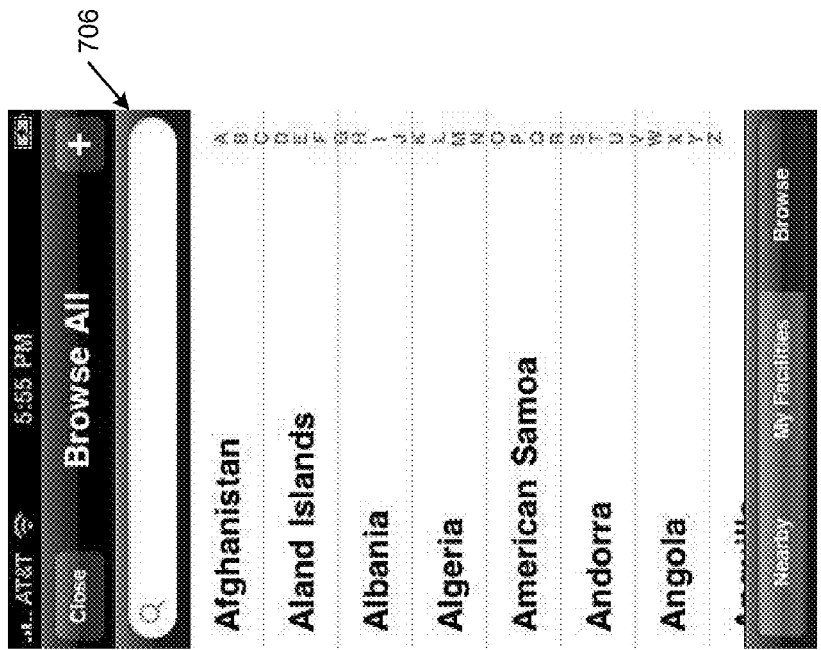
FIG. 9 illustrates a nonlimiting example of an interface that may be provided to a user in response to selection of browse option 704 from FIGS. 7 and 8.

FIG. 9 illustrates a nonlimiting example of an interface that may be provided to a user in response to selection of browse option 704 from FIGS. 7 and 8. More specifically, the interface of FIG. 9 provides an option for the user to select a worldwide geographic location for determining a desired golf course. Additionally, a golf course may be found by a user inputting a keyword of the desired golf course in the search option 706 in any of the interfaces in FIG. 7, 8, or 9.

Figures 10, 11:
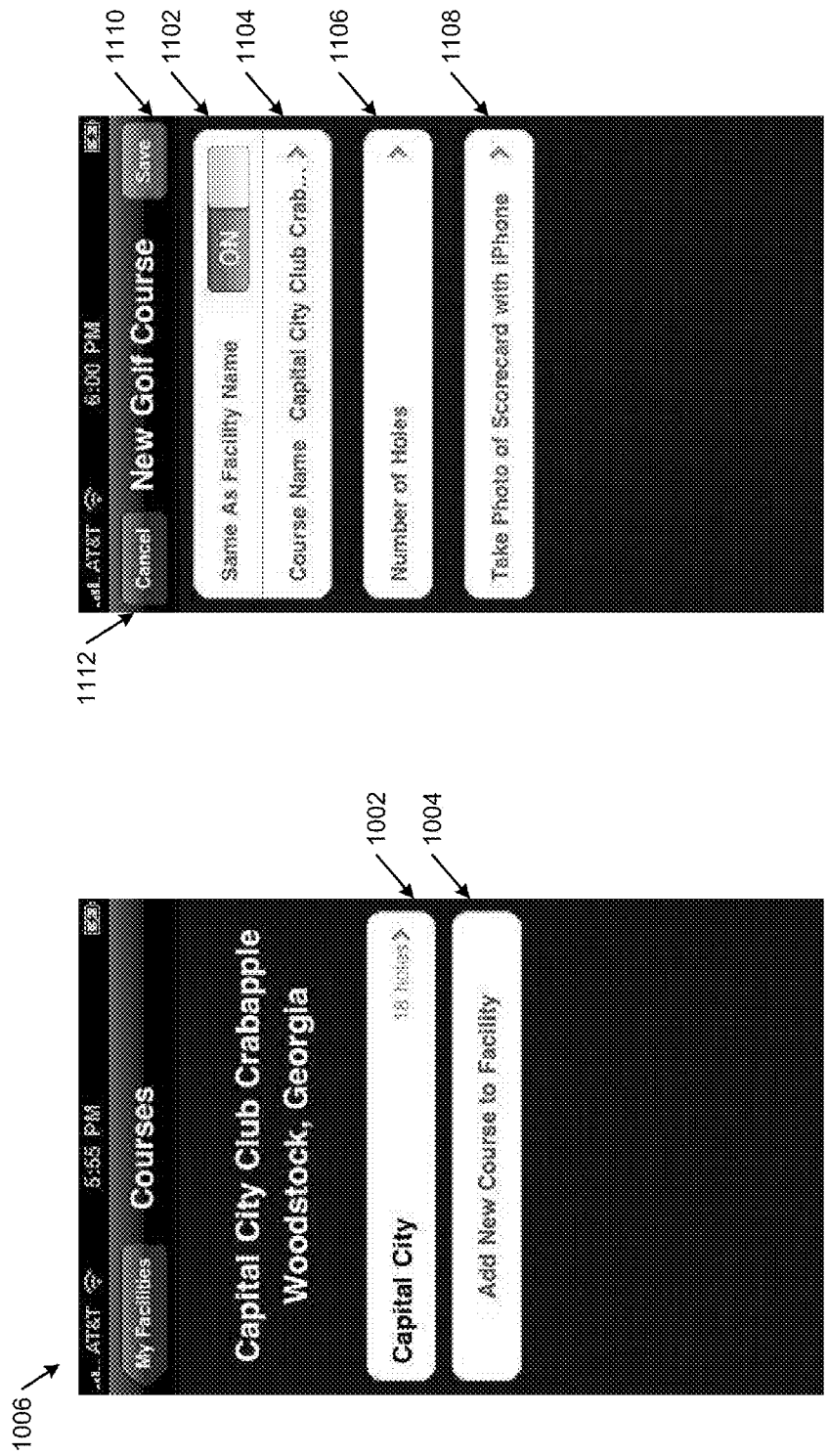
FIG. 10 illustrates a nonlimiting example of an interface that may be provided in response to a selection of a golf course from one or more of the interfaces from FIG. 7, 8, or 9.
FIG. 11 illustrates in a nonlimiting example of an interface that may be provided in response to selection of the add new course option 1004 from FIG. 10.

FIG. 10 illustrates a nonlimiting example of an interface that may be provided in response to a selection of a golf course from one or more of the interfaces from FIG. 7, 8, or 9. As illustrated in FIG. 10, Capital City Club Crabapple has been selected. Accordingly, this golf course is listed with an option 1002 to proceed. If however, the user wishes to add a golf course to the selected facility that is not currently listed, the user may select add new course option 1004. To return to the interface form FIG. 7, 8, or 9, the user may select a my facilities return option 1006.

FIG. 11 illustrates in a nonlimiting example of an interface that may be provided in response to selection of the add new course option 1004 from FIG. 10. As illustrated in FIG. 11, the interface includes a same as facility option 1102, which allows the user to automatically use the same name as in the existing course (e.g., Capital City Club Crabapple). Also included is a course name option 1104, which allows the user to determine the course name. Also included are a number of holes option 1106, which provide an option for the user to select the number of holes on the new course, as well as a photo option 1108 to take a photograph of the scorecard of the new course with the user device 102. A save option 1110 is also included for saving the input data. A cancel option 1112 may be accessed for canceling and returning to a previous interface.

One should note that upon selection of the photo option 1108, the user can take a photograph of the scorecard. The user device 102 may be configured to utilize a text recognition algorithm for converting the captured image into useable scorecard data. This scorecard data may then be entered into the user device, along with the other data input by the user for the new course. Additionally, this scorecard data may be sent to the server 106 such that a new golf course can be provided to other users. Similarly, in at least one nonlimiting example, the user device 102 may be configured to capture the photograph and automatically send the photograph to the server 106. The server 106 can then facilitate capture of the scorecard data via text recognition, technician input, and/or via other techniques.

Figures 12, 13:
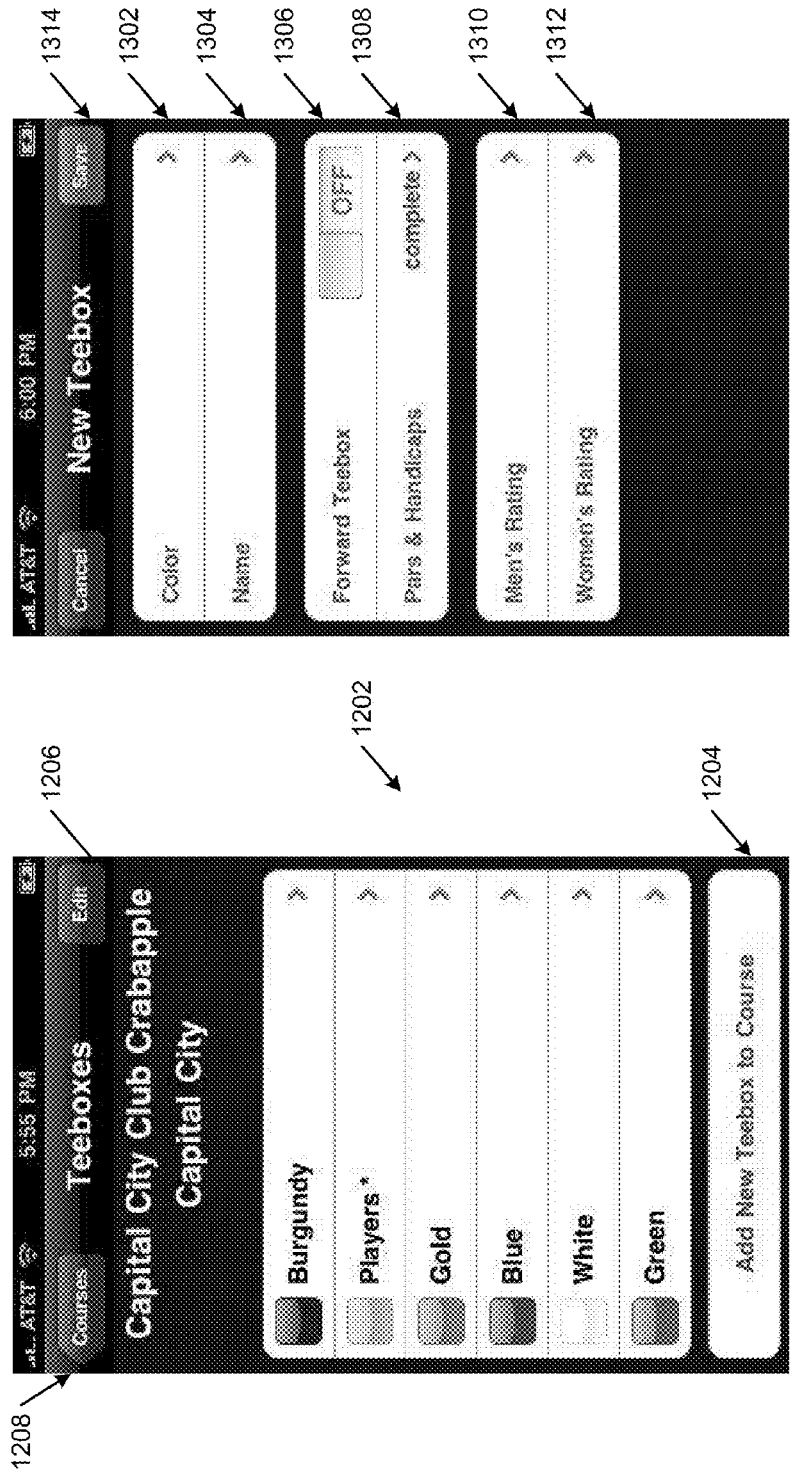
FIG. 12 illustrates a user interface for providing tee box data for a current round, similar to the interface from FIG. 11.
FIG. 13 illustrates a nonlimiting example of an interface that may be provided in response to a user selection of the add new tee box option, from FIG. 12.

FIG. 12 illustrates a user interface for providing tee box data for a current round, similar to the interface from FIG. 11. More specifically, in response to selection of the option 1002 from FIG. 10, the user may be provided with a list 1202 of tee boxes that are provided at the selected golf course. The user can select the tees that he/she is playing in the current round. Additionally, if a tee box is not listed, the user can select the add new tee box option 1204 to create a new tee box. Additionally, if the user wishes to edit and/or delete a currently listed tee box, the user can select an edit option 1206. To return to a previous screen, the user can select the back option 1208.

FIG. 13 illustrates a nonlimiting example of an interface that may be provided in response to a user selection of the add new tee box option 1204, from FIG. 12. As illustrated in FIG. 13, the interface includes a tee color option 1302 for the user to select a color for the new tee box. Similarly, a name option 1304 is provided for the user to select a name of the new tee box. A forward tee box option 1306 is also provided and is configured to select the shortest tees for each hole as the new tee box (which can be edited by the user). Upon activation of the forward tee box option 1306, the pars and handicaps of each hole will automatically be populated with the information of the forward most tees. However, if the forward tee box option 1306 is deactivated, a pars and handicaps option 1308 may be provided (and not populated) for providing an option to input the pars and handicaps for each hole on the new tee box. Also included is a men's rating option 1310 and a women's rating option 1312 for receiving the respective rating for the new tee box. A save option 1314 and a cancel option 1316 are also provided.

FIG. 14 illustrates a nonlimiting example of a user interface that may be provided in response to selection of a tee box from the tee box list 1202, from FIG. 12. As illustrated in FIG. 14, a handicap option 1402 can be provided for indicating whether to include handicaps in the scoring of the current round. Additionally, in at least one configuration, activation of the handicap option can facilitate utilization of the user's (and/or other players') score for input into a handicap calculation system (e.g., golf handicap information network (GHIN) system). Also included is a scoring system option 1404, a start round option 1406, and a back option 1408.

FIG. 15 illustrates a nonlimiting example of a user interface that may be provided in response to selection of the scoring system option 1404, from FIG. 14. As illustrated in FIG. 15, the user can be provided with a plurality of scoring options 1502, such as stroke play, Stableford, match play, Nassau, Wolf, Las Vegas, and/or other scoring options for individuals and/or teams. Also included is a back option 1504 for returning to a previous interface.

FIG. 16 illustrates a nonlimiting example of a user interface that may be provided in response to selection of the start round option 1406, from FIG. 14. As illustrated in FIG. 16, the user may be provided with an option 1602 to add one or more other golfers. Additionally, a start round option 1604 is provided to begin the round.

FIG. 17 illustrates a nonlimiting example of a user interface that may be provided in response to selection of the start round option 1604 from FIG. 16. As illustrated, FIG. 17 may be configured to provide distances to a plurality of points on a given hole of the select golf course, based on the user's current global position. More specifically, in FIG. 17, distances to a back edge of the green of hole 1 is provided, as well as a distance to carry a left bunker, a distance to carry a right bunker, a distance to a front edge of the green, a distance to reach the left bunker, and a distance to reach the right bunker. Also included in FIG. 17 is a GPS option 1702 for providing the GPS distances shown in FIG. 17, a score option (described in more detail below) 1704, a previous hole option 1706*a*, a next hole option 1706*b*, and an information option 1706 to provide information and options regarding canceling the current round.

FIG. 18 is a nonlimiting example of a user interface for providing an image of a golf hole, similar to the diagram from FIG. 17. As illustrated in FIG. 18, an aerial option 1802 and a score option 1804 are provided, similar to FIG. 17. Similarly, a previous hole option 1806*a* and a next hole option 1806*b* are also provided. Further, FIG. 18 includes lay up points 1808*a*, 1808*b*, and 1808*c* to show a user static and/or dynamic lay up positions, described in more detail in FIG. 19. These lay up points 1808 may correspond to the lay up positions 412 described with regard to FIG. 4, without presenting the segment line 402. Some embodiments may be configured to display the segment line.

FIG. 19 illustrates a nonlimiting example of a user interface for providing lay up points, such as illustrated in FIG. 18. As illustrated in FIG. 19, one or more lay up points may be provided for the user to be applied to any hole. More specifically, a user may be more proficient and/or desire to hit a shot from a particular distance. (e.g., 100 yards with a sand wedge could be the user's favorite club and/or distance). Accordingly, the user may specify this preference in the option 1902*a*. Once saved, (e.g., via save option 1904), a lay up point (such as lay up points 1808*a*, 1808*b*, and 1808*c* from FIG. 18) may be provided on the aerial view, which corresponds to the specified distance. Further, a distance from the user's current location to that lay up position may also be provided in the interface from FIG. 17. Additionally, as described above, if one or more of the distances indicated in options 1902*a*-1902*d* reside in a hazard for a particular hole, that lay up point (e.g., lay up point 1808 in FIG. 18 and/or distance displayed in FIG. 17) may be prevented from display.

One should note that while the user may manually specify the distances and/or club selection in options 1902, this is a nonlimiting example. More specifically, as described in more detail below, various statistics may be compiled and analyzed. Accordingly, in some embodiments a determination of the user's most proficient distance and/or club may be automatically determined and provided in the interface in FIG. 19 (as well as in FIGS. 17 and 18). Other embodiments may simply provide static lay up positions at common lay up points for a particular hole and/or for a user of a particular handicap.

Similarly, other factors may be utilized in determining one or more desired lay up positions. As a nonlimiting example, a determination of a user's past performance on the hole, may be utilized. Other factors such as obstacles on a particular hole may cause an alteration of a lay up position. More specifically, if the user's desired lay up position is 100 yards, but on hole 16 of a particular golf course, the fairway narrows significantly at that distance, the user device 102 may automatically move the desired lay up position to avoid that obstacle. Other factors that may alter a desired lay up position include wind (and/or other environmental factors), pin position, elevation of a particular green and/or fairway, current position of a user's ball, etc.

Figure 20:
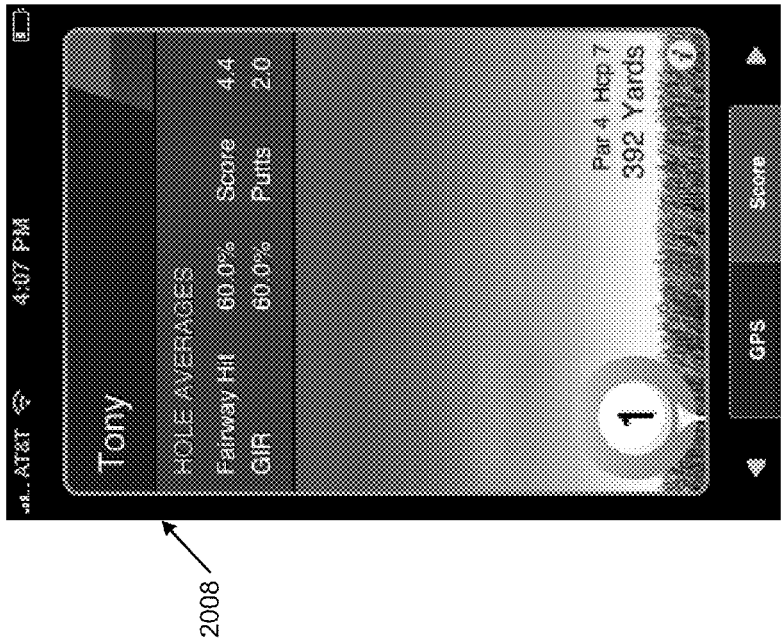
FIG. 20 illustrates a nonlimiting example of a user interface for providing statistical data regarding a user's performance on a particular hole, as may be accessed by selecting the score option from FIGS. 17 and 18.

FIG. 20 illustrates a nonlimiting example of a user interface for providing statistical data regarding a user's performance on a particular hole, as may be accessed by selecting the score option 1704, 1804 from FIGS. 17 and 18. As illustrated in FIG. 20, a GPS option 2002, a score option 2004, a previous hole option 2006*a*, and a next hole option 2006*b* are provided. Additionally, statistical data, such as fairway hit percentage, green in regulation (GIR) percentage, average score, and average putts may be provided. This statistical data may refer to the user and/or all users that play this particular hole. Also included is a score entry option 2008.

One should note that in the nonlimiting example of FIG. 20, only "Tony" is displayed. However, if in the interface of FIG. 16, the user entered other golfers, those other golfers would be provided under "Tony" with an option to enter their scores, as well.

Figure 21:
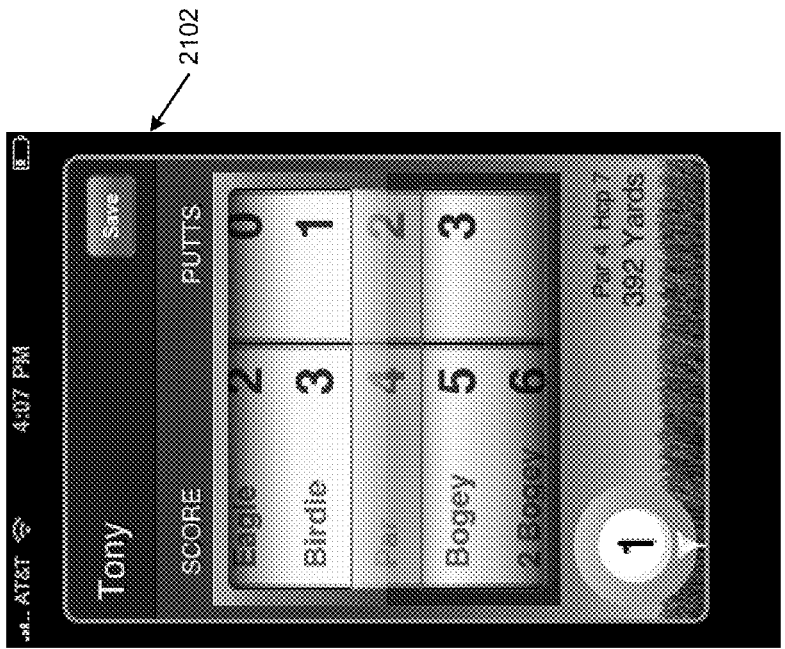
FIG. 21 illustrates a nonlimiting example of a user interface for providing a user's score on a golf hole, as may be accessed via selection of the enter score option, from FIG. 20.

FIG. 21 illustrates a nonlimiting example of a user interface for providing a user's score on a golf hole, as may be accessed via selection of the enter score option 2008, from FIG. 20. As illustrated in FIG. 21, the user may select the score and/or the number of putts on the hole. One should note that the default score and holes may vary depending on one or more factors. As a nonlimiting example, if the user selects "par" for his or her score, the user device 102 may automatically default to "2" for the number of putts. While the user can change this if the user did not putt twice, by defaulting to "2" the user's input may be reduced.

Similarly, other factors may be utilized in determining the default score and/or putts. As a nonlimiting example, if the user's average score is 4.4 (as shown in FIG. 20), the user device 102 may default to par ("4") for the score. Similarly, if the average number of putts is 2.0 (as also shown in FIG. 20), the default number of putts may be 2. Further, as another nonlimiting example, the user device 102 may be configured to determine the user's handicap and/or other information for determining a default score to thereby reduce the user input while receiving the desired scoring data. By selecting a save option 2102, the score may be saved.

One should note that the user device 102 may determine some scoring data without prompting the user for the information. As a nonlimiting example, if the user selects "par" as the score and "2" for the number of putts, the user device 102 can safely assume that the user hit the green in regulation. Similarly, if the user selects "par" as the score and "1" as the number of putts, the user device 102 can safely assume that the user missed the green on his approach shot, but "got up and down" to save par. Similarly, other determinations may be made based on the data received.

Figure 22:
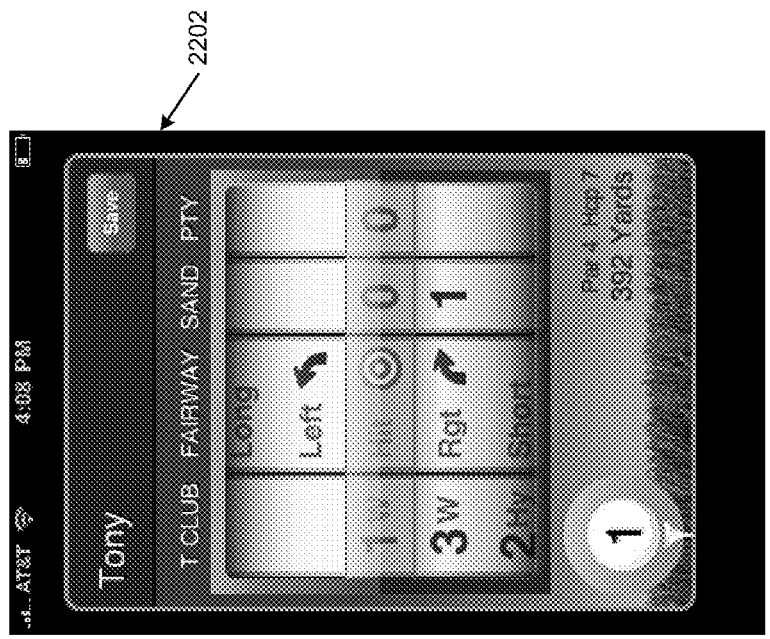
FIG. 22 illustrates a nonlimiting example of a user interface for receiving supplemental scoring data, similar to the diagram from FIG. 21.

FIG. 22 illustrates a nonlimiting example of a user interface for receiving supplemental scoring data, similar to the diagram from FIG. 21. More specifically, upon selection of the save option 2102 in FIG. 21, the user may be presented with an option to select the club used off the tee box for this particular hole, as well as whether the user reached the fairway (and if not, how the fairway was missed), whether the user's ball came to rest in a bunker at some point on the hole, and whether the user incurred any penalty shots during the hole. Additionally, other data may be received from the user, such as clubs used on approach shots, and/or other data. Upon selection of a save option 2202, the supplemental scoring data may be saved.

Figure 23:
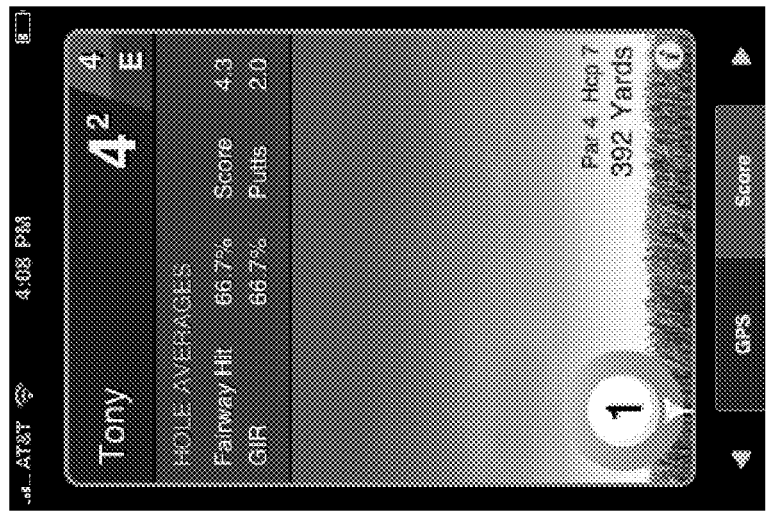
FIG. 23 illustrates a nonlimiting example of a user interface for indicating score, upon completion of a hole, similar to the diagram from FIG. 20.

FIG. 23 illustrates a nonlimiting example of a user interface for indicating score, upon completion of a hole, similar to the diagram from FIG. 20. As illustrated, after selecting the save option 2202 in FIG. 22, the interface of FIG. 23 may be provided. More specifically, in FIG. 23, score data 2302 indicates that the user scored "4" on hole 1 with "2" putts (shown in blue). The "4" in gray indicates the user's total score for the round and the "E" indicates his score relative to par ("E" meaning even par). By selecting a next hole option 2304, the user may proceed to the next hole. The interfaces for the other 17 holes may be similarly provided.

One should note that compiling and analyzing scoring data may also be utilized for automatically providing the user with club selection data the next time the user plays a hole. More specifically, as illustrated in FIG. 23, the user hit the fairway of hole 1 67.7% of the time. The user device 102 may also know which club was used for each of those shots. If the user hits the fairway 100% with a 4 iron, but 0% of the time with a driver, the user device 102 may suggest the user hit a 4 iron. Similarly, it the user device determines that despite missing the fairway, the user averages a better score when hitting a driver, the user device 102 may suggest the user hit a driver.

While this information may be provided after a user has previously played a hole, the in some embodiments, the user device 102 can suggest club selection even if the user has never played a particular course and/or hole. More specifically, based on the user's statistical averages, characteristics of a particular hole, environmental factors, etc., the user device 102 may provide club selection and/or strategy information to the user.

FIGS. 24A and 24B illustrate scorecard data, as may be compiled from user input in the interfaces from FIGS. 20-23. More specifically, in FIG. 24A, data regarding the front nine holes is provided. In FIG. 24B, data regarding the back nine holes is provided. Although not explicitly shown, cumulative data for the entire round may also be provided. While the scorecard data may be provided upon completion of (or during) the round, scorecard data, such as that shown in FIGS. 24A and 24B may also be provided upon selection of scorecard option 606, from FIG. 6 at any time. More specifically, the user device 102 can store rounds upon completion for subsequent viewing. Similarly, the server 106 may also be configured to receive and store the scorecard data for viewing from any device over a wide area network (WAN).

Figure 25:
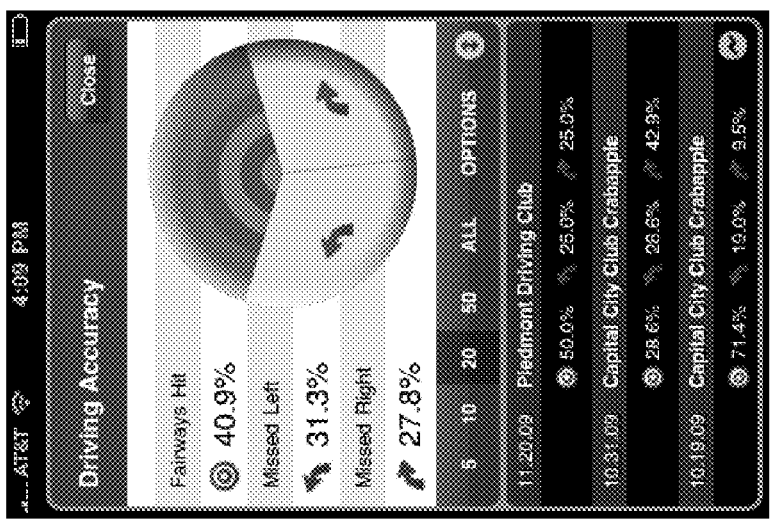
FIG. 25 illustrates a nonlimiting example of a user interface that may be provided in response to selection of the statistics option 604, from FIG. 6.

FIG. 25 illustrates a nonlimiting example of a user interface that may be provided in response to selection of the statistics option 604, from FIG. 6. More specifically, the interface of FIG. 25 illustrates driving accuracy data. This data may be a compilation of the last 5 rounds, the last 20 rounds, the last 50 rounds, all rounds, or other number of rounds. Additionally, individual rounds may also be listed. This data may be compiled from the scorecard data, such as that illustrated in FIGS. 24A and 24B.

Figure 26:
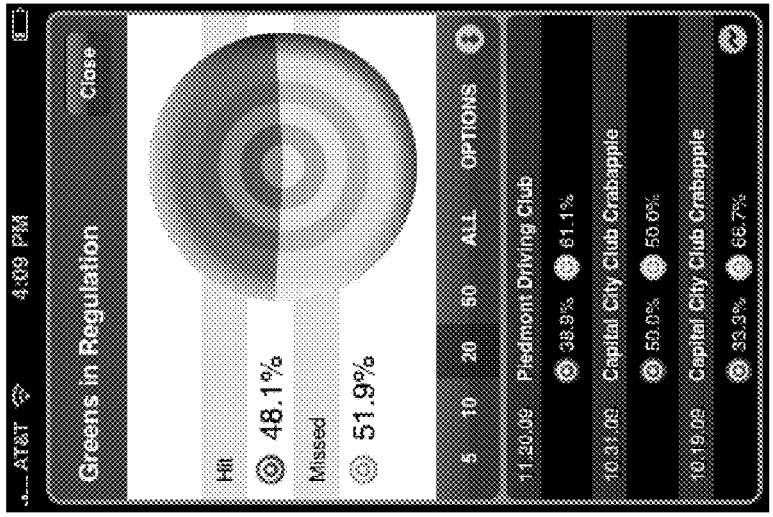
FIG. 26 illustrates a nonlimiting example of a user interface that may be provided, similar to the interface from FIG. 25.

FIG. 26 illustrates a nonlimiting example of a user interface that may be provided, similar to the interface from FIG. 25. More specifically, the data from FIG. 26 relates to greens in regulation, and is similar to the data format provided in FIG. 25.

Figure 27:
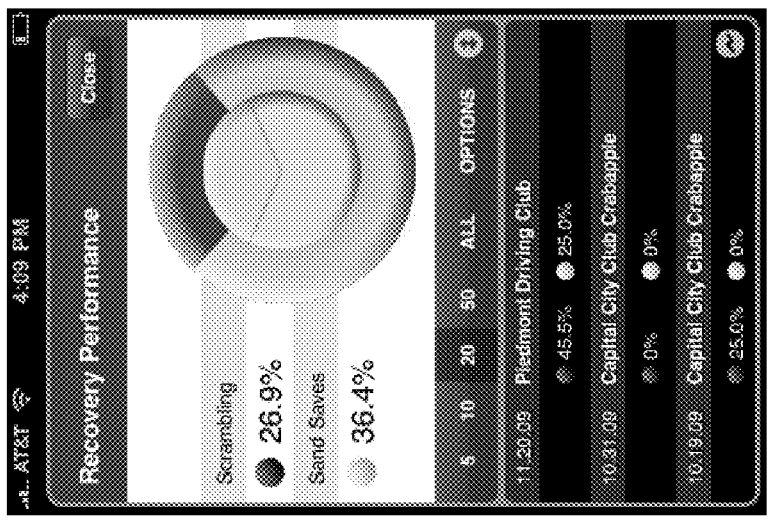
FIG. 27 illustrates a nonlimiting example of a user interface that may be provided, similar to the interface from FIG. 26.

FIG. 27 illustrates a nonlimiting example of a user interface that may be provided, similar to the interface from FIG. 26. More specifically, the data from FIG. 27 relates to recovery performances, such as scrambling and sand saves.

Figure 28:
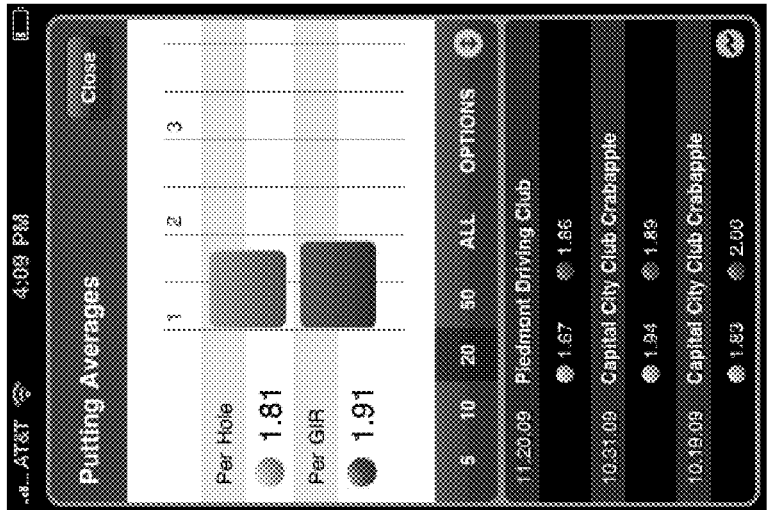
FIG. 28 illustrates a nonlimiting example of a user interface that may be provided, similar to the interface from FIG. 27.

FIG. 28 illustrates a nonlimiting example of a user interface that may be provided, similar to the interface from FIG. 27. More specifically, the data from FIG. 28 relates to putting averages including putts per hole and putts per green in regulation.

Figure 29:
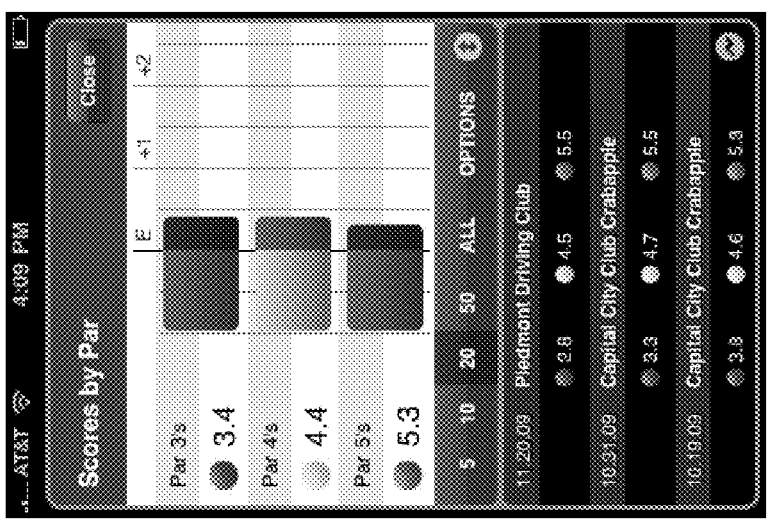
FIG. 29 illustrates a nonlimiting example of a user interface that may be provided, similar to the interface from FIG. 28.

FIG. 29 illustrates a nonlimiting example of a user interface that may be provided, similar to the interface from FIG. 28. More specifically, the data from FIG. 29 relates to scoring averages by par of the hole. More specifically, the user illustrated in FIG. 29 averages 3.4 strokes on par 3's, 4.4 strokes on par 4's, and 5.3 strokes on par 5's.

Figure 30:
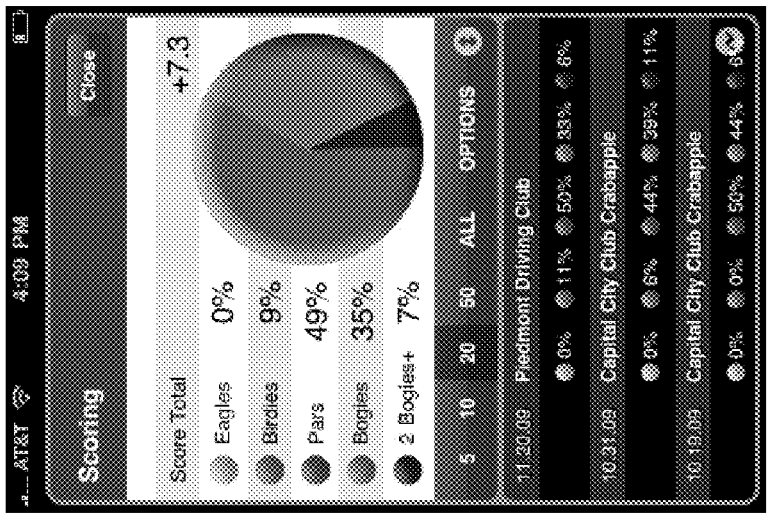
FIG. 30 illustrates a nonlimiting example of a user interface that may be provided, similar to the interface from FIG. 29.

FIG. 30 illustrates a nonlimiting example of a user interface that may be provided, similar to the interface from FIG. 29. More specifically, the data from FIG. 30 relates to total scoring averages in relation to par. More specifically, the user illustrated in FIG. 30 pars 49% of the holes; bogies 35% of the holes; birdies 9% of the holes; and double bogies (or worse) 7% of the holes. The user's score total averages 7.3 over par.

One should note that the interfaces of FIGS. 25-30 illustrate overall statistics of a round. Similarly, other statistical data may be provided, such as data for a particular hole, particular course, club selection data, etc.

Figure 31B:
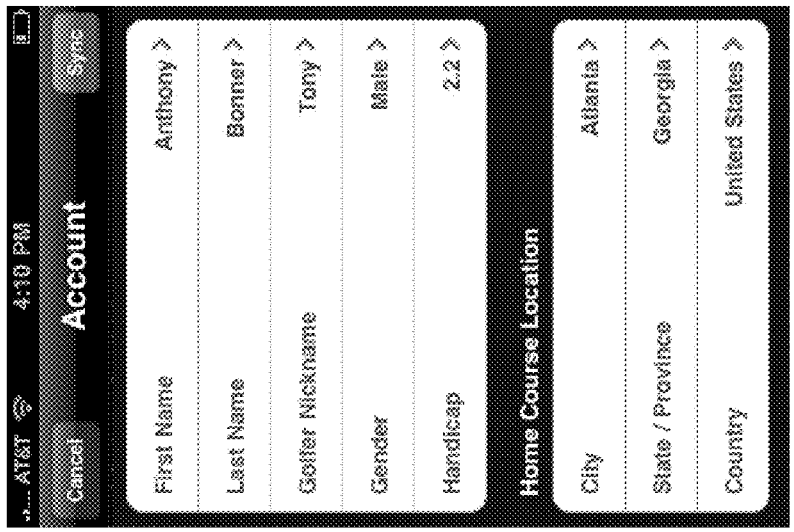
FIGS. 31A and 31B illustrate a nonlimiting example of a user interface that may be provided in response to selection of the account option, from FIG. 6.
Figure 31A:
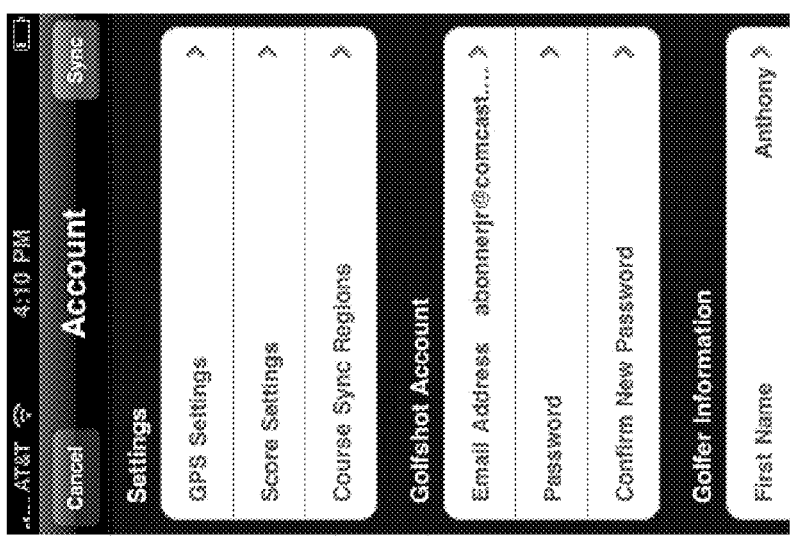

FIGS. 31A and 31B illustrate a nonlimiting example of a user interface that may be provided in response to selection of the account option 610, from FIG. 6. As illustrated in FIG. 31A, the user may configure various settings, such as GPS settings, score settings, course sync regions. Additionally, account information may also be configured, as well as golfer information and home course location.

Figure 32A:
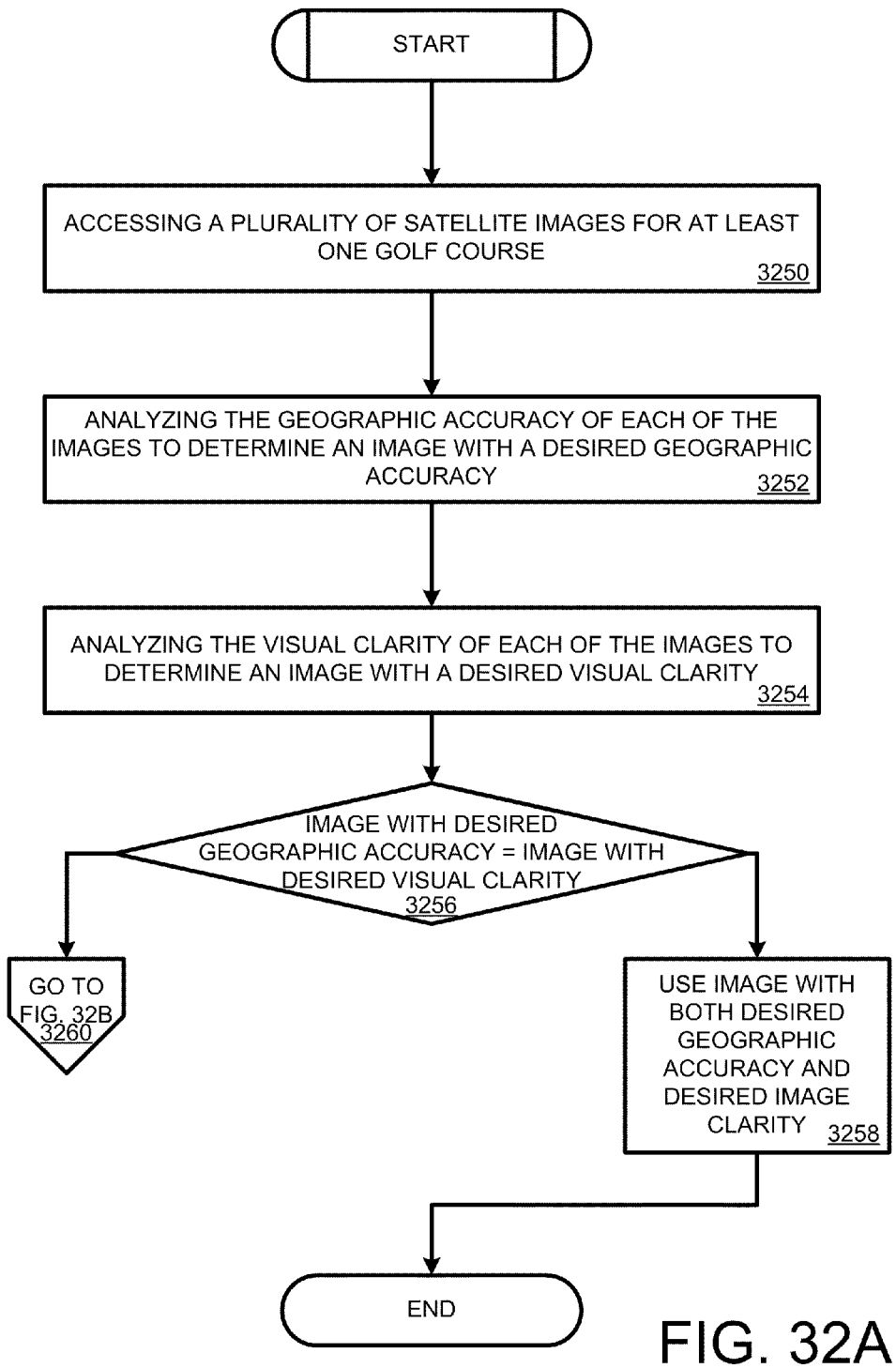
FIGS. 32A and 32B illustrate a nonlimiting example of a process that may be utilized in merging a plurality of images, such as in the system of FIG. 1.
Figure 32B:
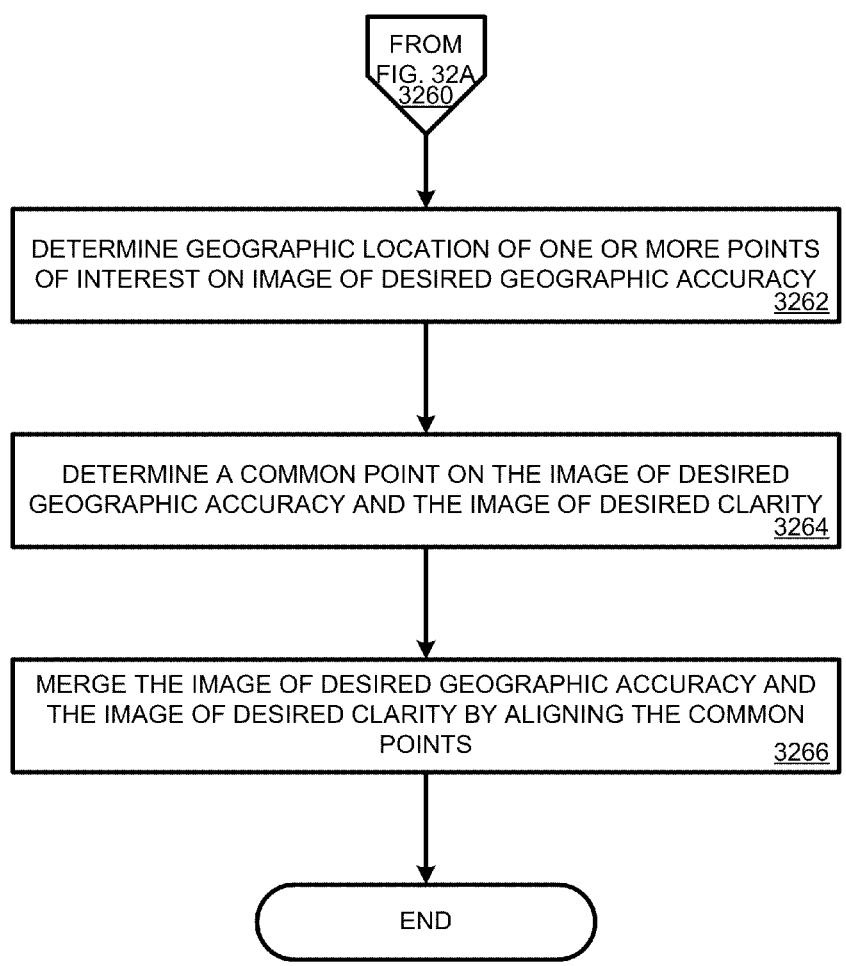

FIGS. 32A and 32B illustrate a nonlimiting example of a process that may be utilized in merging a plurality of images, such as in the system of FIG. 1. As illustrated in FIG. 32A, a plurality of images may be accessed for a golf course, such as by the user device 102 and/or by the server 106 (block 3250). The images may be from different providers; however, this is not a requirement. Additionally, each of the images may be analyzed for geographic accuracy to determine an image that meets predetermined criteria for geographic accuracy (block 3252). This analysis may include comparing the golf course image with road data and/or via other techniques. The images may additionally be analyzed for visual clarity to determine an image that meets predetermined criteria for visual clarity (block 3254). This analysis may take the form of determining metadata to determine the clarity of the images; a visual inspection of the images; and/or other analysis techniques.

A determination may then be made regarding whether the image with the desired geographic accuracy is the same image with the desired visual clarity (block 3256). If so, that image may be geographically mapped (block 3258). If however, the image with the desired geographic accuracy is a different image than the image with desired image clarity, the process proceeds to jump block 3260, continued in FIG. 32B.

FIG. 32B is a continuation of the process from FIG. 32A. More specifically, from jump block 3260, a determination may be made regarding the geographic location of one or more points of interest on the image of desired geographic accuracy (block 3262). Additionally, a common point may be determined on the image of desired geographic accuracy and the image of desired image clarity (block 3264). More specifically, as described above, the common point may be, for example, the pin of the first hole. As the green of the first hole will be in the same geographic location for both images (in this nonlimiting example), this location can be utilized as a common point. Additionally, some embodiments may use two common points for this purpose. The image of desired geographic accuracy and the image of desired image clarity may then be merged, by aligning the determined common points (block 3266). Once the images are merged, the image with desired image clarity may be provided to the user with the geographic data of the image of desired geographic accuracy.

Figure 33:
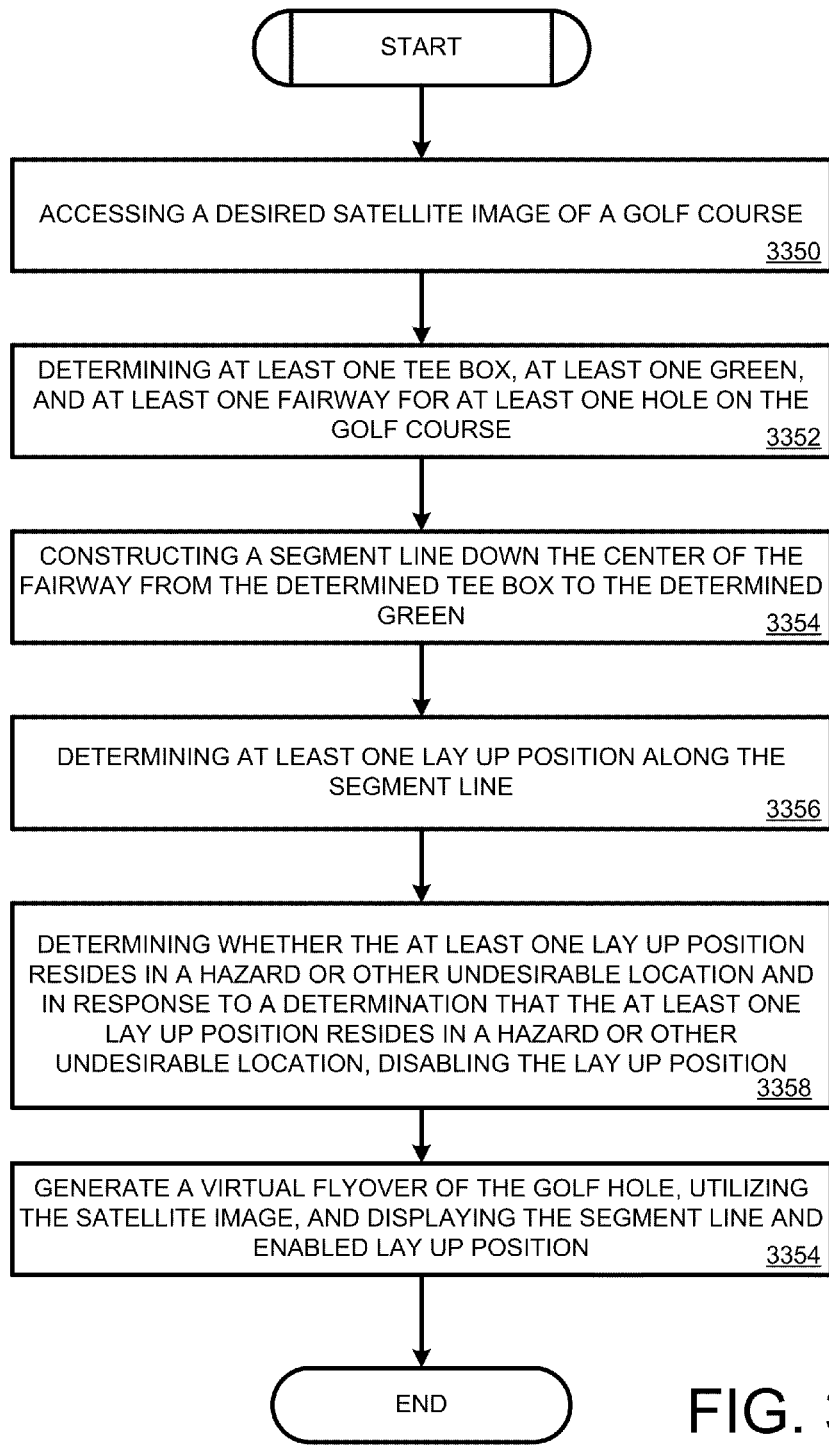
FIG. 33 illustrates a nonlimiting example of a process that may be utilized for determining one or more lay up positions on a golf course, similar to the diagram from FIGS. 32A and 32B.

FIG. 33 illustrates a nonlimiting example of a process that may be utilized for determining one or more lay up positions on a golf course, similar to the diagram from FIGS. 32A and 32B. As illustrated, a desired image of a golf course may be accessed (block 3350). A determination of the location of at least one tee box, at least one green, and at least one fairway on the image may be made for at least one hole on the golf course (block 3352). As described above, this determination may be made based on a visual inspection and/or an analysis of the image.

Additionally, a segment line may be constructed on the image, down the center of the determined fairway from the tee box to the green (block 3354). At least one lay up position may be determined along the segment line (block 3356). As described in more detail above, the lay up positions may be user defined, static, based on past user performance, and/or based on other criteria. However, once the one or more lay up positions are determined, a determination can be made regarding whether any of the lay up positions resides in a hazard or other undesirable location on a particular hole and, in response to a determination that this is the case, that lay up position may be disabled (block 3358). A virtual flyover of the golf hole may also be generated, utilizing the image and displaying the segment line and enabled lay up position (block 3360).

Figure 34:
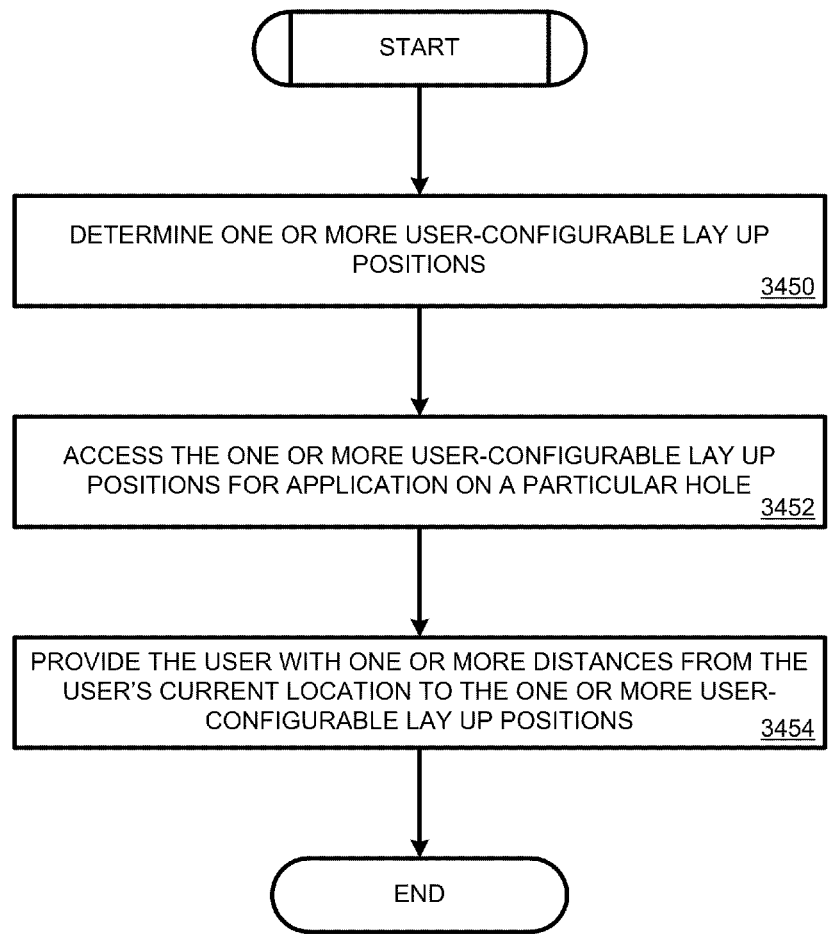
FIG. 34 illustrates a nonlimiting example of a process that may be utilized for providing user-configurable lay up positions, similar to the flowchart from FIG. 33.

FIG. 34 illustrates a nonlimiting example of a process that may be utilized for providing user-configurable lay up positions, similar to the flowchart from FIG. 33. As illustrated in FIG. 34, one or more user-configurable lay up positions may be determined (block 3450). As discussed above, the user-configurable lay up positions may be determined via user input, and/or automatically determined, with an option for a user to edit. Regardless, the one or more user-configurable lay up positions may be accessed for a particular hole (block 3452). More specifically, while some lay up positions may be specific to a particular hole, in some embodiments, the lay up positions may be general in that they may be applied to (almost) any hole. As a nonlimiting example, if the user selects 100 yards as a lay up position, that 100 yards may be utilized for any par 4 or par 5. However, block 3452 refers to application of a lay up position to a particular hole. Once this has occurred, the user may be provided with one or more distances from the user's current location to the one or more user-configurable lay up positions (block 3454).

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any statutorily and judicially recognized means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. Further, the scope of the present disclosure is intended to cover all combinations and sub-combinations of all elements, features, and aspects discussed above. All such modifications and variations are intended to be included herein within the scope of this disclosure.

Therefore, at least the following is claimed:

1. A computer-implemented method for displaying lay up positions on a user computing device, the method comprising:
    receiving an overhead image of a portion of a golf course, the overhead image obtained using a satellite network via a network interface;
    providing a user interface on a display of the user computing device;
    receiving via the user interface, one or more lay up distance preferences in association with one or more selected golf clubs;
    displaying on the display of the user computing device a segment line on the overhead image, the segment line extending between a tee box on a golf hole and a green on the golf hole, and bisecting a fairway of the hole;
    automatically determining, by a processor on the user computing device, at least one lay up position on the segment line, the at least one lay up position indicating a predetermined distance from the green, wherein the at least one lay up position is determined using the one or more lay up distance preferences;
    displaying the at least one lay up position on the display of the user computing device, the user computing device configured to determine a distance between the user computing device and the lay up position;
    automatically determining, by the user computing device, whether the at least one lay up position is located in a hazard; and
    in response to determining the at least one lay up position is located in a hazard, automatically disabling, by the user computing device, the displaying of the at least one lay up position.

2. The method of claim 1, further comprising displaying a separate segment line for each hole on the golf course.

3. The method of claim 1, further comprising displaying a flyover animation of the golf hole utilizing a rendering of the overhead image, the flyover animation being directed along the segment line.

4. A user computing device comprising:
    a display;
    a processor coupled to the display;
    a memory coupled to the processor;
    an application stored in the memory and executable using the processor, the application comprising:
    logic that receives an overhead image of a portion of a golf course, the overhead image obtained using a satellite network via a network interface;
    logic that provides a user interface on the display of the user computing device;
    logic that receives via the user interface, one or more lay up distance preferences in association with one or more selected golf clubs
    logic that displays on the display of the user computing device a segment line on the overhead, the segment line extending between a tee box on a golf hole and a green on a golf hole, and bisecting a fairway of the golf hole;
    logic that automatically determines at least one lay up position on the segment line, the at least one lay up position indicating a predetermined distance from the green, the at least one lay up position is determined using the one or more lay up distance preferences; and
    logic that displays on the display the at least one lay up position to a user device, the user computing device is configured to determine a distance between the user device and the lay up position.

5. The user computing device of claim 4, wherein the application is further configured to store a least one user customizable lay up position.

6. The user computing device of claim 4, wherein the application is further configured to store a segment line for each hole on the golf course.

7. The user computing device of claim 4, wherein the user interface is further configured to receive user configurable lay up positions.

8. The user computing device of claim 4, wherein the application is further configured to determine whether the at least one lay up position is located in a hazard.

9. The user computing device of claim 8, wherein the application is further configured to, in response to determining that at least one lay up position is located in a hazard, disable the at least one lay up position.

10. The user computing device of claim 4, wherein the application further configured to display a flyover animation of the golf hole utilizing a rendering of the image, the flyover animation being directed along the segment line.

11. A system comprising:
- means for receiving an overhead image of a portion of a golf course, the overhead image obtained using a satellite network via a network interface;
- means for providing a user interface on a display of the user computing device and receiving via the user interface, one or more lay up distance preferences in association with one or more selected golf clubs;
- means for displaying a segment line on a computer display of the overhead image, the segment line being constructed from a tee box on a golf hole to a green on the golf hole, the segment line bisecting a fairway of the golf hole; and for displaying at least one lay up position to a user device;
- means for automatically determining the at least one lay up position on the segment line, the at least one lay up position indicating a predetermined distance from the green, the predetermined distance derived from the one or more lay up distance preferences; and for determining a distance between the user computing device and the at least one lay up position.

12. The system of claim 11, wherein the means for providing a user interface further comprises means for receiving at least one user customizable lay up position.

13. The system of claim 11, wherein the means for displaying further comprises means for displaying a segment line for each hole on the golf course.

14. The system of claim 11, further comprising means to store data related to a user's past performance.

15. The system of claim 11, wherein the means for automatically determining further comprises:
- means for determining whether the at least one lay up position is located in a hazard; and
- means for, in response to determining the at least one lay up position is located in a hazard, disabling the at least one lay up position.

16. The system of claim 11, wherein the means for displaying further comprises means for displaying a flyover animation of the golf hole utilizing a rendering of the image, the flyover animation being directed along the segment line.

* * * * *